June 15, 1937.  M. N. BULFORD  2,084,189
APPARATUS FOR DYEING
Filed Dec. 7, 1933   8 Sheets-Sheet 1
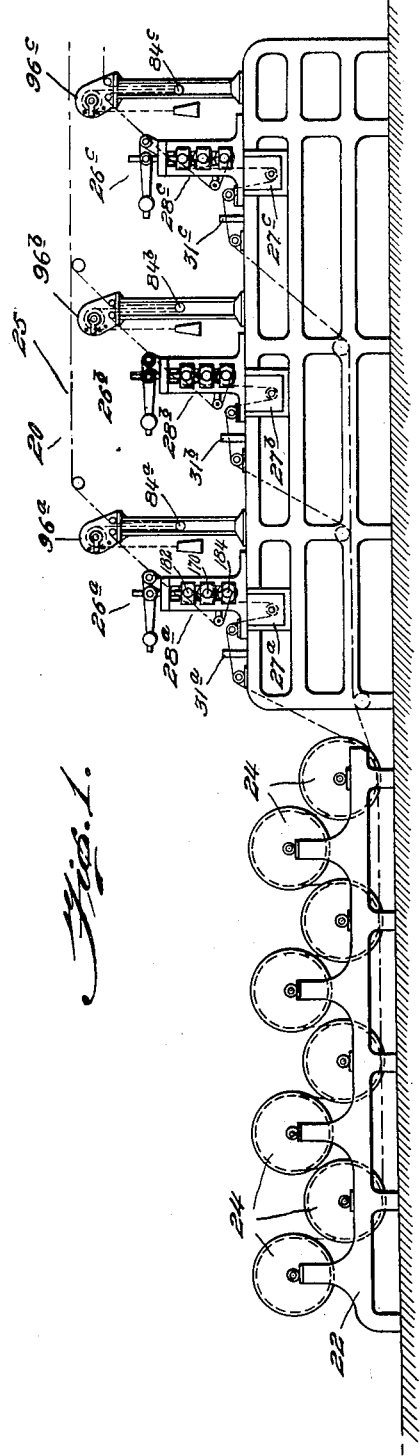
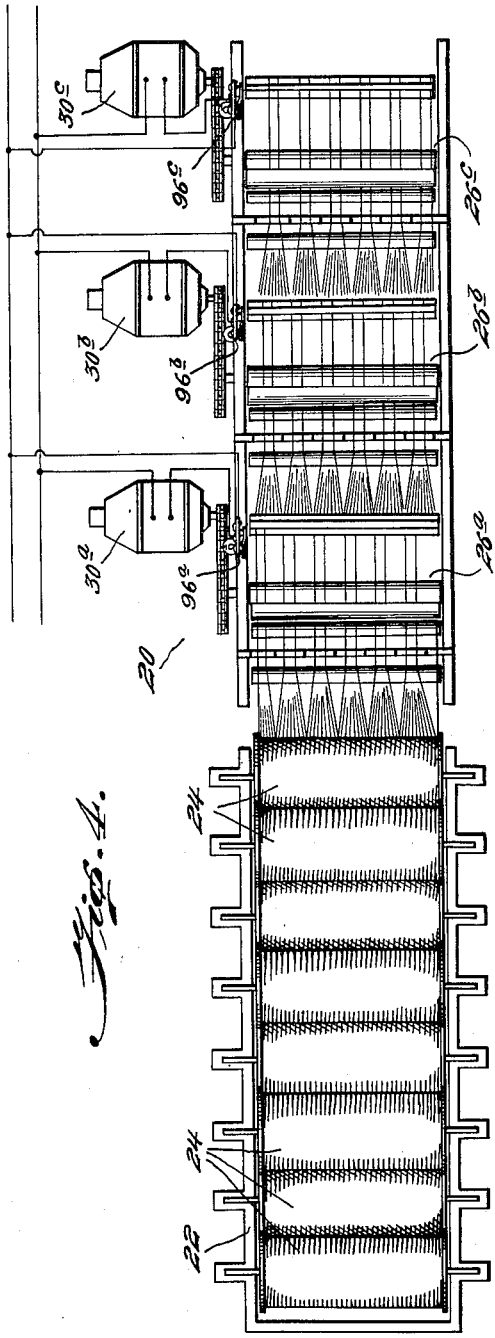
Inventor
Murray N. Bulford
By Thomas A. Jenckes
Attorney

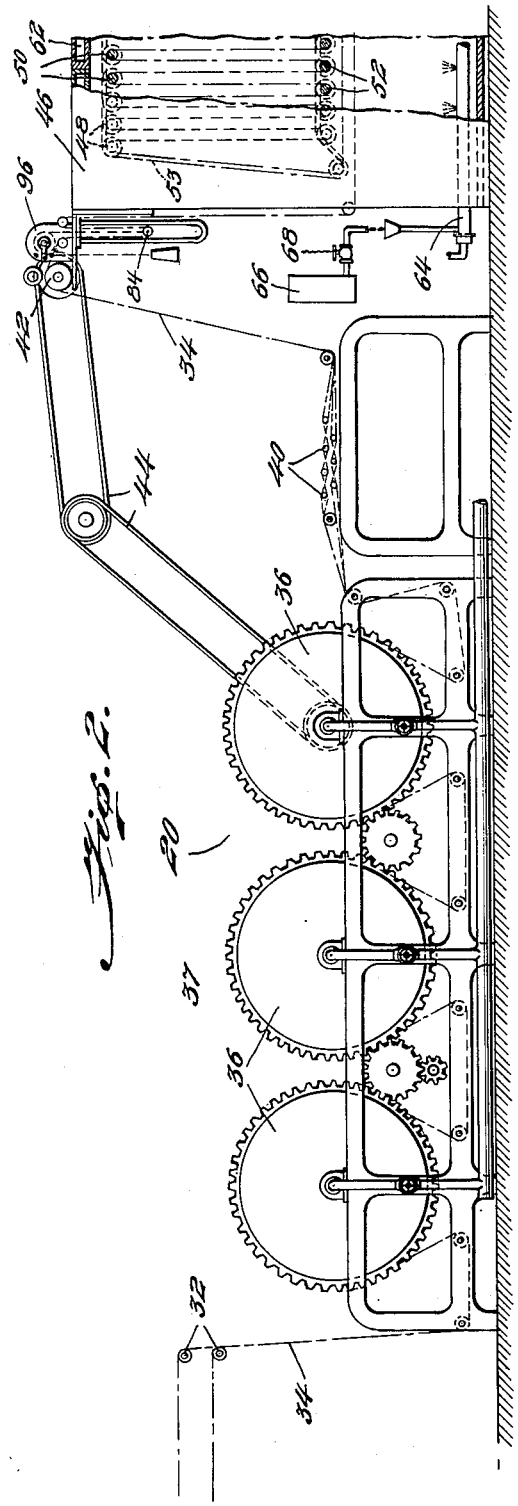
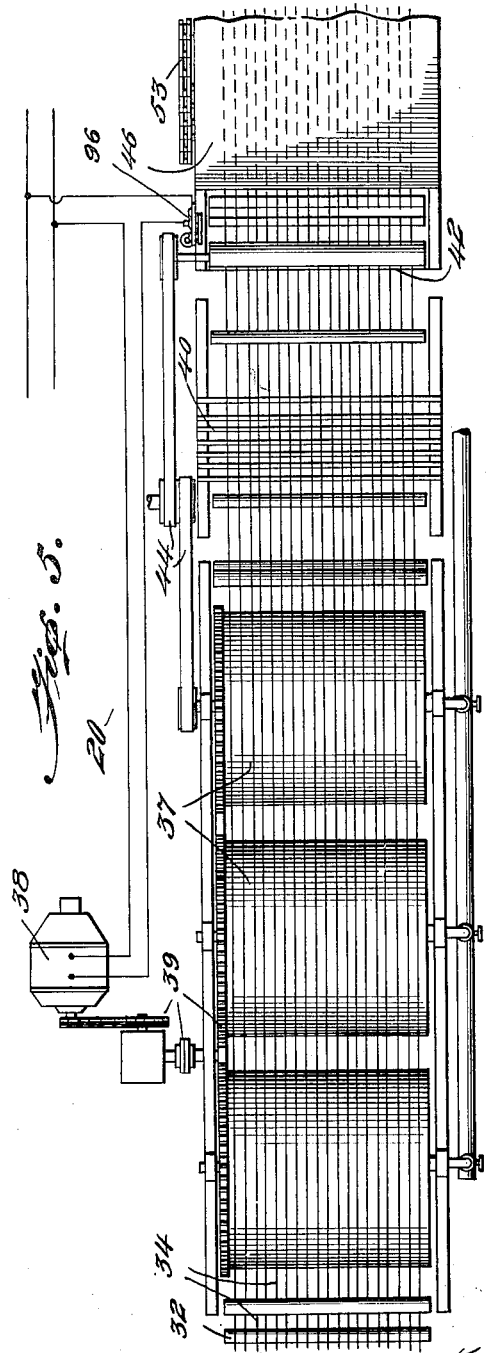

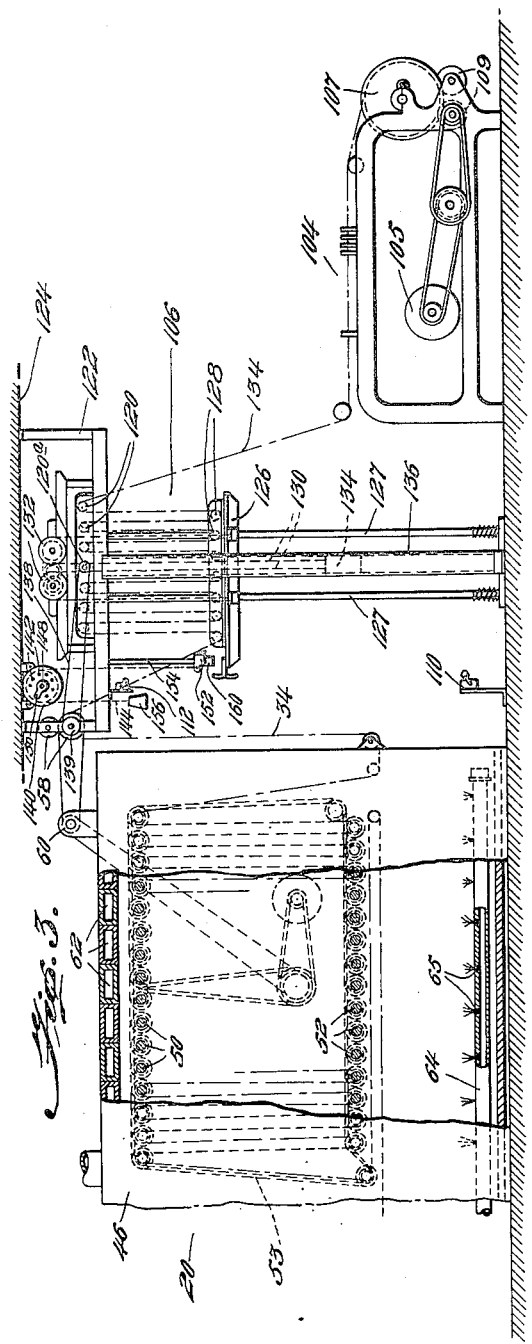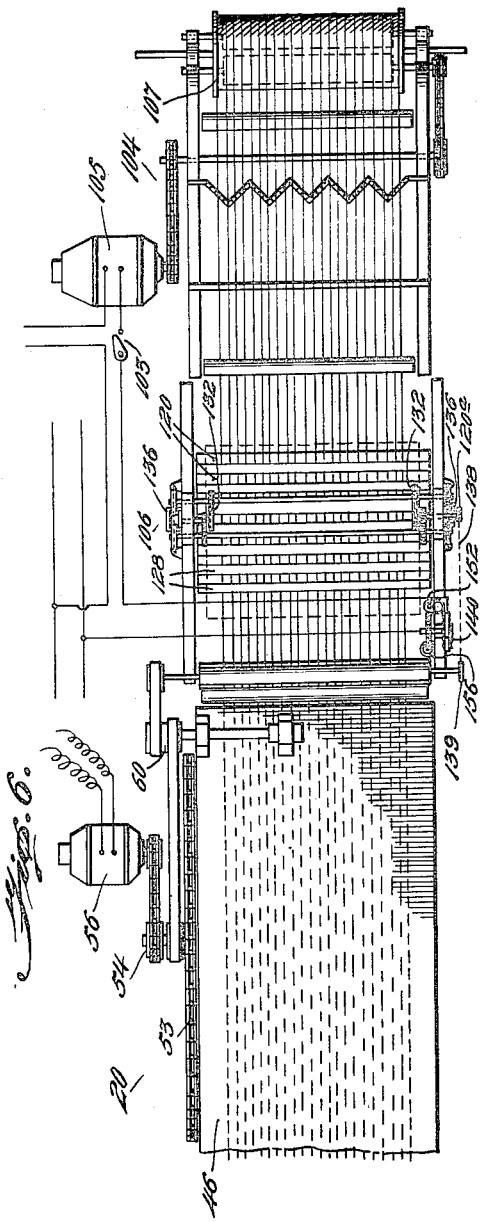

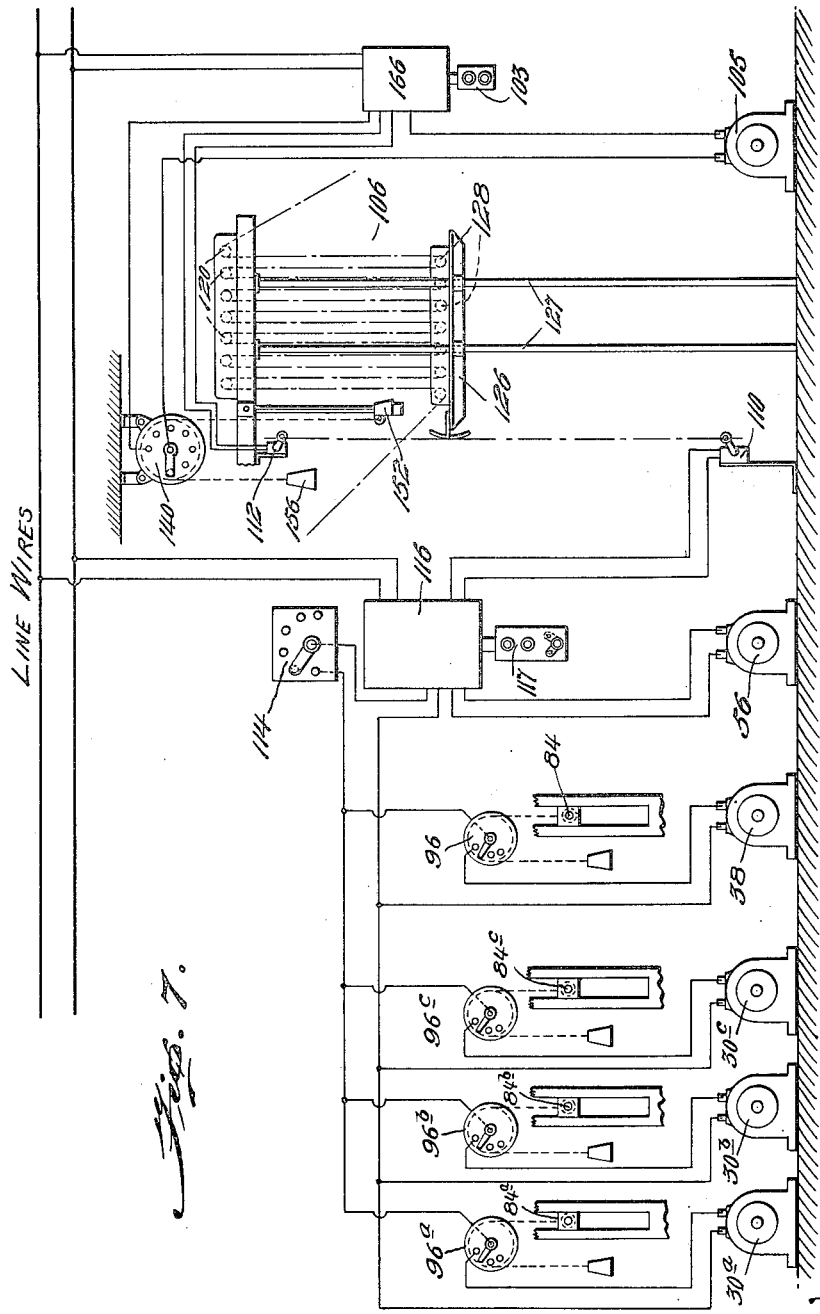

June 15, 1937. M. N. BULFORD 2,084,189
APPARATUS FOR DYEING
Filed Dec. 7, 1933 8 Sheets-Sheet 5
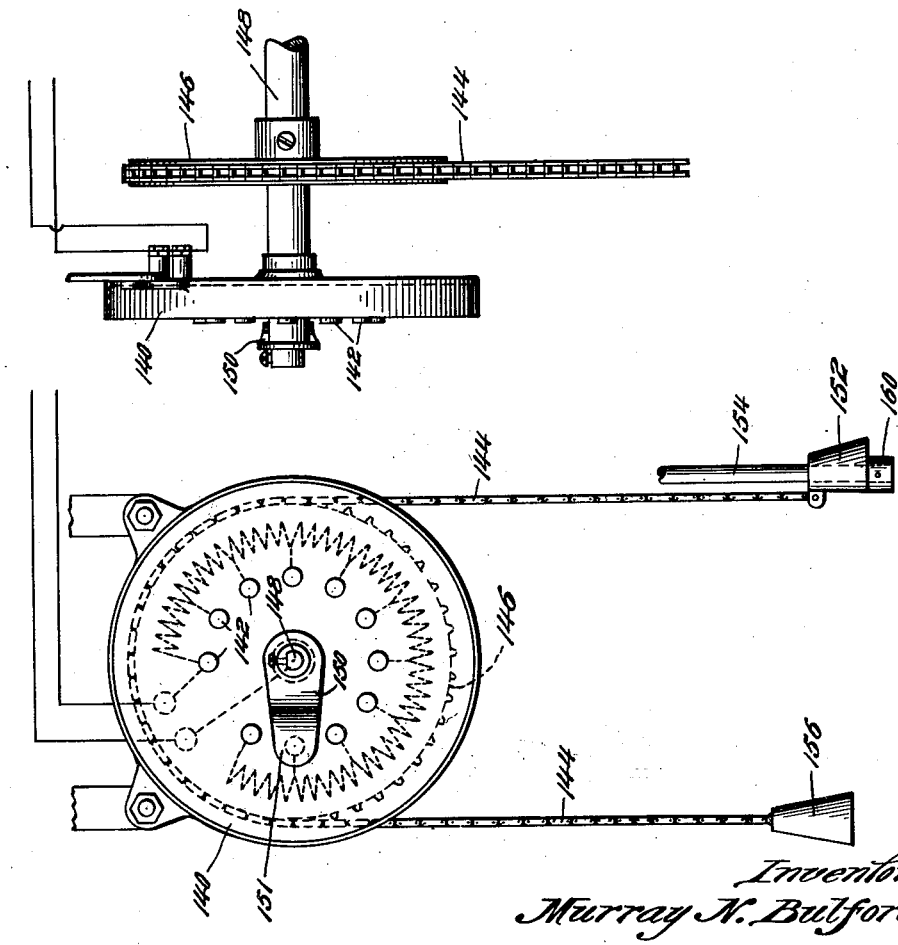

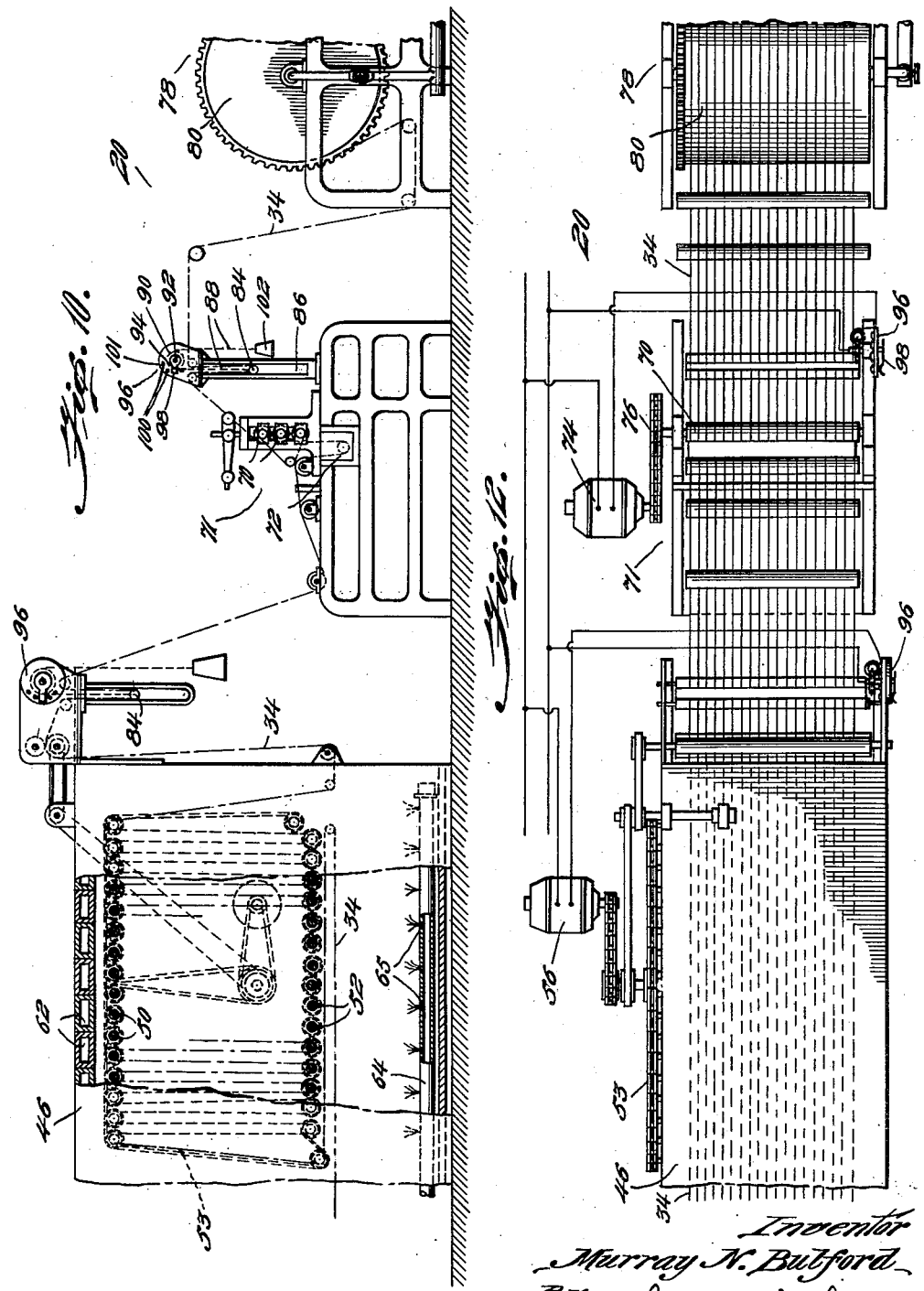

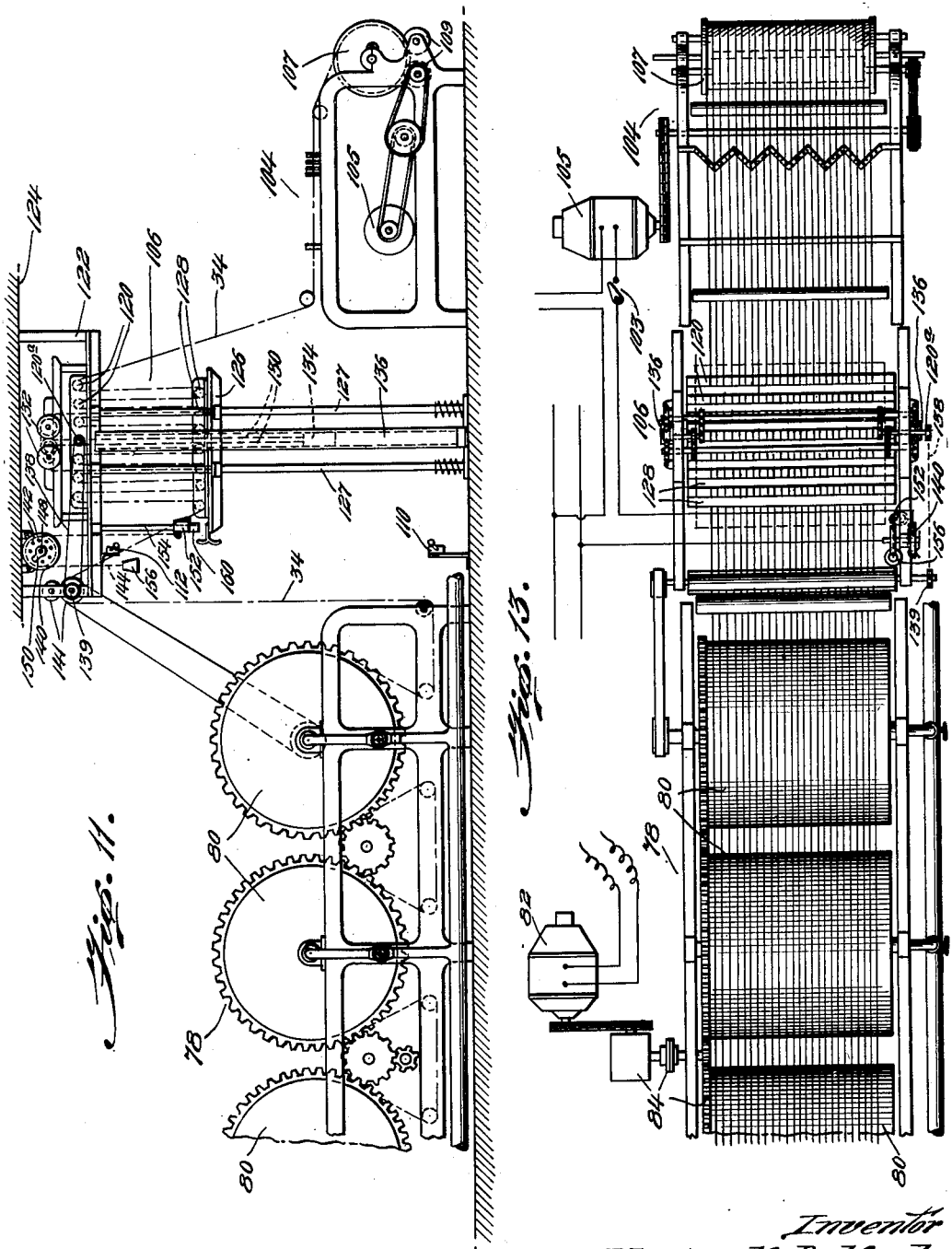

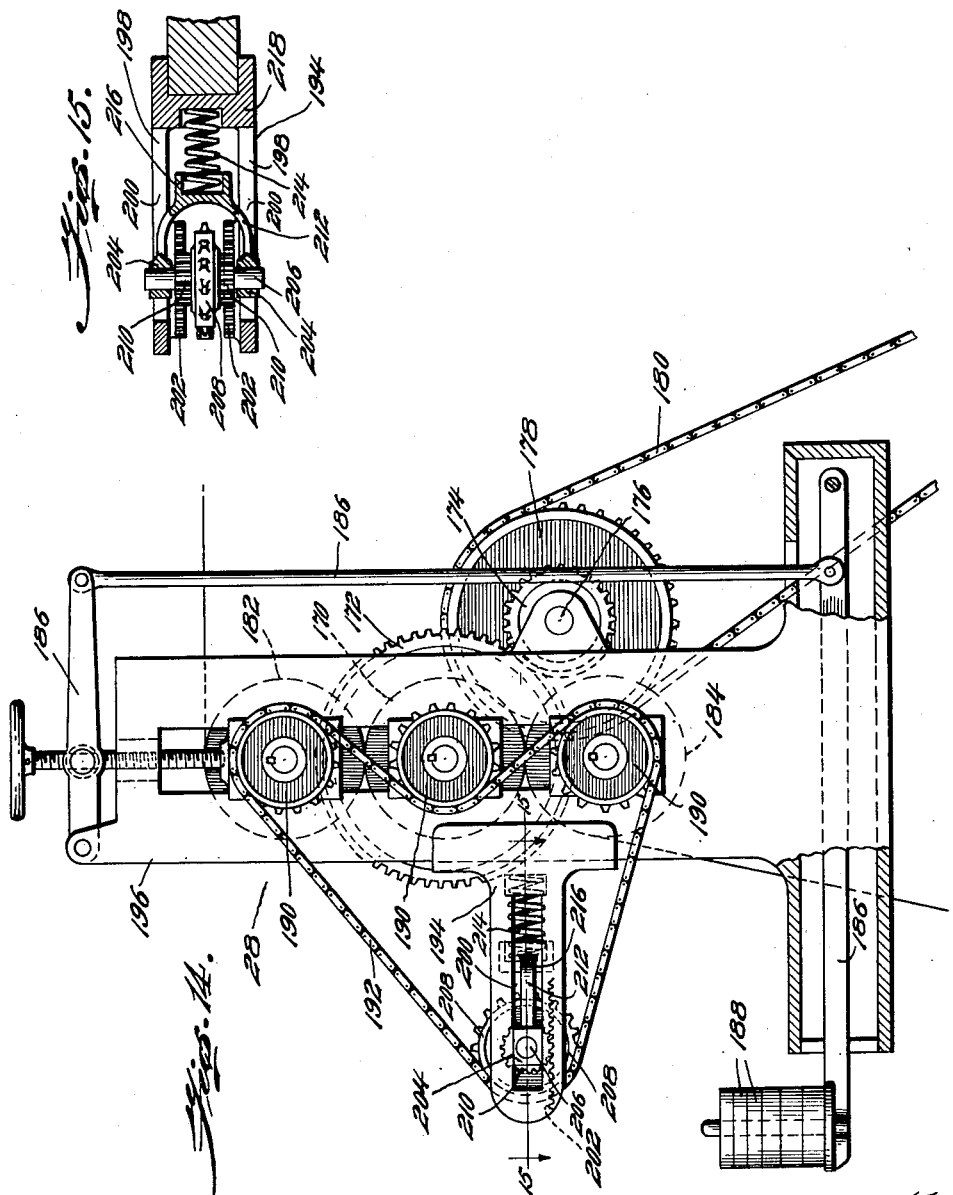

Patented June 15, 1937

2,084,189

UNITED STATES PATENT OFFICE 2,084,189

APPARATUS FOR DYEING

Murray N. Bulford, Pontiac, R. I., assignor to B. B. & R. Knight Corporation, a corporation of Rhode Island Application December 7, 1933, Serial No. 701,278

40 Claims. (Cl. 8—19)

My invention relates to improvements in dyeing and includes specifically a novel apparatus for dyeing yarn, either warps or filling in sheet form, or fabrics in sheet form automatically.

While my improved apparatus may be employed for dyeing cloth in sheet form, it is particularly designed for use in dyeing warp ends in sheet form prior to weaving and in the same continuous automatic operation suitably sizing them for weaving, so, if desired, they may be woven with different colored fillings employed to produce a cross dyed effect. I am aware that others, namely, Watson in his Reissue Patent No. 17,295, reissued May 14, 1929 and other patents, have attempted to treat in the slashing operation the warp with a dye ingredient so that when the cloth is later after treated, after weaving, the warp would develop the proper color. I am also aware that others have attempted to dye with a direct color or tint directly in the slasher. Any dyes that can be applied directly in the slasher, however, are not of a permanent nature and with a process similar to the Watson process where the warp has laid around for a considerable period of time before being woven and later being after treated to develop the dyestuff on the fibre, it has been found that in most plants such a long time has normally elapsed in this operation that the dyeing produced by the Watson process has not been consistently as perfect as desired. For this reason I have provided an apparatus for continuously and automatically completely dyeing and sizing the warp in sheet form prior to weaving. To save time and space and motive power, I preferably simultaneously dye in a vat and simultaneously slash the fabric with suitable size for weaving in the same vat. I have found that with the proper selection of dyestuffs, sizing materials and a suitable penetrant such as described in my copending application for patent for Slashing warps, S. N. 362,849, filed May 13, 1929 that a dye ingredient may be employed in the sizing operation preferably if a suitable penetrant is also employed to make the size fully penetrate the fabric and that care must be exercised in the selection of a penetrant to choose one which will have no appreciable effect upon the dye ingredient's functioning in dyeing. I have found that if suitable dye ingredients and penetrants be affixed to the warp in a single bath, the goods suitably dried and passed through an ager with or without the addition of volatile organic acid fumes as later to be described that the dyeing will be substantially completed on the warp prior to any weaving. Insofar as certain features of my invention are concerned, other than the sizing operation, namely, the dyeing apparatus, the specific chemicals employed, the sequence of steps in the dyeing, drying and ageing apparatus may be employed in dyeing fabrics as well as in dyeing warp ends.

The complicated methods of warp dyeing now in practice are exceedingly difficult and expensive. The warp is usually wound on a beam, made into a chain, dyed, rewound and then rewound on a beam, thus necessitating a large plurality of steps. Employing my process and apparatus, however, I preferably continuously dye the warp in sheet form, size it preferably simultaneously therewith, dry it and age it and wind it on a beam suitable for weaving in a continuous automatic process, thereby saving the large expense of handling and rehandling inherent in present types of warp dyeing now on the market.

The present methods of dyeing filling are generally similar, it taking in general an extremely long time to dye filling and due to the fact that the chain or other dye units are so small, it has been extremely difficult to uniformly dye them. Filling threads are normally given a less twist than the warp threads and are usually lighter and are even relatively harder to dye uniformly than warp threads. I preferably construct my improved apparatus with ball bearings throughout and with such means to ease the passage of yarn or cloth therethrough, such as the dancer roll controls later to be described and the squeeze rolls so positively driven as to prevent slippage or friction in between and consequent frictional distortion or markings thereon, that I am enabled to wind filling threads on a beam and dye them in my apparatus in a similar manner to warp threads without slashing them. If desired, certain ends of filling from specific beams may be dyed different colors, combined as described for warps, passed through the balance of my apparatus and wound on a single beam from which they may be selectively wound onto respective bobbins for use as colored filling threads having a single color on each bobbin.

Further objects of my invention therefore are to dye yarn in sheet form whether warp or filling and to provide a process and apparatus which will speed up the delivery time, in case orders for fancy shades are received, and to provide a method which will dye great lengths of warps or fillings without piecing up ends, in a uniform shade, thereby saving a large expense in the labor formerly thought necessary in rehandling in the actual dyeing of warp or filling, to speed up the time of delivery thereof and to dye great lengths of warp or filling uniform shades.

I have found in practice that it is substantially impossible to dye fabric and more particularly a warp or yarn which has a large plurality of ends that tend to get tangled up and is very hard to keep in a sheet form on dyeing or treating units which are run from a common drive shaft, due to the fact that there is, due to the nature of the fibres employed and spinning imperfections, a tendency of certain parts of the warp or fabric to stretch or shrink more than others. So far as I am aware former types of apparatus or methods for treating warps in sheet form in a succession of apparatuses through a single drive shaft have proven impractical due to the fact that the cloth or yarn tending to stretch or shrink more between certain apparatus, tends to clog up the driving rolls thereof and to relieve which it is necessary to take down practically the entire apparatus and to cut the cloth, or under varying speeds between different apparatuses the cloth or yarn is stretched so that it will break. So far as I am aware no completely practical apparatus or method has been devised for continuously treating sheet warp or filling yarn of any nature to a succession of dyeing or sizing or treating steps. Due to the fact that so far as I am aware all previous attempts have attempted to drive a succession of apparatuses from a single drive shaft and have not taken in account the relative increasing and decreasing amount of slack produced due to either (1) variations in individual fibres, more particularly the lengths thereof in the succession of yarn or fabric (2) imperfections in spinning which tend to make certain threads stretch more than others and (3) change of stretchability of the cloth or warp as it is dampened, chemically treated and dried, I believe I am the first therefore to take this difficulty of a continuous treatment of yarn ends in sheet form, or fabric into consideration and by automatically controlling the speed of the successive dyeing and treating apparatuses in my continuous process and apparatus in accordance with the slack produced between individual machines I am enabled to selectively vary the speed of the individual machines within sufficient limits to permit the cloth or yarn ends in sheet form to be driven through the succession of dyeing and treating machines and allow for (1) the variations in length or stretch thereof due to imperfections in spinning, weaving, relative inequalities of the length of the different fibres and (2) the stretching and contracting of the fabric or threads as they become successively treated with the different wet chemicals and dried in the continuous process.

A further feature of my invention relates to the fact that in dyeing a sheet selected warp or filling threads may be taken off selected beams, passed through individual dye vats, simultaneously sized, if desired, and then combined in a common beam for the later drying, ageing, or other successive aftertreatments of my continuous process thereby providing a warp beam already made up in which selected threads are separated, dyed in stripes and later combined in the completed warp ready for weaving.

A further feature of my invention relates to the fact that I am enabled to provide a method and apparatus comprising a dyeing apparatus made up of a succession of a plurality of different units for suitably dyeing the fabric or yarn in sheet form which may be run continuously so as to leave no dye spots or size marks thereon and from which the fabric or warp may be respectively batched or beamed intermittently. In order to permit intermittent batching or loading or unloading before or after the dyeing and/or treating apparatus, I preferably provide between said dyeing or treating and batching or loading units, either of which may be first, a slack accumulator and I thus during the intermittent packaging of the fabric units in sheet form for further manipulation, or the intermittent unloading thereof automatically intermittently accumulate slack in the moving sheet of fabric to permit the fabric to continuously move in the heretofore described continuous treatment.

In the preferred embodiment of my invention I preferably run the batching apparatus normally at a different speed than that of the dyeing apparatus and after the slack has reached a predetermined minimum, then synchronize the speed of the loading apparatus with that of the treating apparatus to provide for the stretch of fabric in between as I have provided between successive units of the dyeing and/or treating apparatus. I also in my preferred embodiment provide means to automatically cut off the dyeing and treating apparatus when the slack has reached a predetermined maximum or minimum and means to cut off the batching apparatus when the slack has reached a predetermined opposite maximum or minimum, to prevent tearing or balling up of the fabric and if desired make these means automatic so that the respective units or means will again start up when the slack has been brought again between the predetermined maximum and minimum limits. By employing this slack accumulator and locating it, in my preferred embodiment, after the sizing apparatus, it is apparent that I am enabled to continuously dye, age, size, or otherwise preliminarily treat the cloth or warp without permitting the stoppage thereof to cause dye or size spots thereon and automatically intermittently batch or load the fabric or warp. In my preferred embodiment I preferably provide a master control to selectively vary the speed of the entire dyeing apparatus, start or stop it, run it at slow or fast speed and simultaneously, if desired, the batching apparatus. In my preferred embodiment, each individual unit in the dyeing and treating apparatus and the batching unit is run by a separate motor controlled in its speed respectively by the amount of slack between its respective unit and the unit adjacent. I thus am enabled to provide an intermittent loading or unloading process and apparatus which will permit the continuous running of the treating apparatus and at the same time where treating web, fabric, yarn, or cloth in sheet form provide for the stretch in the fibres, yarn, or cloth, both inherent from their method of manufacture and due to changes in their respective wetness and dryness and temperature of the various treatments, so that no machine or unit in a series will become clogged up or tear the fabric.

A further feature of my invention therefore relates to the improved form of slack accumulator I employ, which is adapted to be interposed between the continuous treatment unit and the loading or unloading unit and which permits one of said units in a continuous treatment to run continuously and the loading and unloading unit to run at a lesser or greater speed as required, to take up the slack in the accumulator and when the slack has been taken up after the batching or loading or unloading by said increased or decreased speed, synchronizing the relative speeds of the driving means of said respective intermittent and continuous units so as to merely compensate for the stretch in the fabric therebetween and in combination therewith of means to shut off the continuously running treating unit or the intermittent unit when the slack in the slack accumulator has reached predetermined maximum or minimum limits and if desired, automatically restarting the respective units when the slack has again come between the maximum and minimum limits. So far as I am aware I believe this type of slack accumulator is new between any type of a continuously running unit and an intermittently run unit.

Further features of my invention relate to such a slack accumulating unit broadly and the specific electrical and other features of my improved embodiment thereof.

Further features of my invention relate to the improved chemical treatment I may employ in my continuous process and apparatus, or which if desired, may be employed with other apparatus. As stated, my improved method consists of the method of completely dyeing with a dye ingredient incapable of dyeing the warp or fabric in a single bath without after treatment, prior to weaving if warp or filling threads be employed. There are four general types of dyestuffs on the market today for the use of which my improved method and apparatus are particularly adapted, namely, indigosols which are ester-like derivatives of the leuco compounds of vat dyestuffs, rapidogens which are mixtures of a naphthol, preferably one of the A. S. group and a diazotized base bonded with an anti-coupling agent, vat dyestuffs and oxidizable dyestuffs like aniline black. Both indigosols and rapidogens today are extremely popular in printing, but so far as I am aware they have not been employed for dyeing warps or filling yarns in sheet form or for dyeing an entire fabric. I have found that if such dyes be applied in a dye vat and the fabric after treated, preferably in an ager with steam or otherwise under certain conditions of heat and with the addition of volatile organic acid fumes, that in case of indigosols the organic acid fumes will function to split off the ester to provide the soluble leuco compound which will become absorbed by the fabric in the ager as is usual in vat dyeing and which will later as in the case of vat dyestuffs be oxidized to reform the vat dyestuff on the fabric. If rapidogens are employed and they be similarly treated in an ager with volatile organic acid fumes, the volatile organic acid fumes will function to split off the anti-coupling agent from the diazotized base to permit the diazotized base to couple as usual with a naphthol of the A. S. group to form the insoluble diazo dye directly on the fabric.

For this purpose I preferably provide an ager having means to introduce not only steam for the proper reaction temperature therein but also where it is desired to employ indigosols or rapidogens therein with means to introduce volatile organic acid fumes therein to split off from said respective classes of dyestuffs the necessary ingredients to permit the remainder to function as usual to form the respective dyestuff in the well known methods of dyeing of the respective general class of dyestuffs. For any type of dyestuffs employed I may do this with a size and with a suitable penetrant, preferably one which has no effect on the functioning of the dye ingredient. For rapidogens I may therefore use pine oil. Where an oxidizing agent such as a chromium salt is employed, specifically in some instances in the case of indigosols to oxidize the later formed leuco compound into the dyestuff if pine oil were employed it would tend to precipitate as a chromium soap. To prevent this therefore in such an instance I would use as a penetrant a sulphonated fatty alcohol such as Gardinol, or cresylic acid or a phenolic compound immune to chromium. In dyeing with an oxidizable color such as aniline black I would use a suitable oxygen carrier or oxidizing agent, which would oxidize the aniline black in the ager when treated with steam to the desired aniline black.

My apparatus and method may be employed in dyeing with vat dyestuffs, in which instance the vat dyestuff would be reduced to a leuco compound in the ager as usual under the influence of steam and the reducing agent normally employed in printing therewith and oxidized on the fabric as usual. When the dye ingredient is applied in combination with the size, so far as I am aware, this is novel. In summary therefore, an object of my invention is to provide an improved preferably combined dyeing and sizing method and apparatus, which includes not only the dyeing and other sizing treatment apparatus employed continuously, but also an intermittent loading and unloading apparatus so that the fabric or warp ends may be treated to a continuous treatment of heat, dyeing, sizing and chemicals without stoppage of the portions thereof being treated and consequent dye or size spots on the fabric or warp.

A further object of my invention is to provide such an apparatus which will continuously dye fabric or warp or filling yarn according to the various chemical methods heretofore described with a minimum amount of power and a minimum amount of labor and which will function in a commercial manner efficiently without stopping due to the fact that I have provided for the stretch of the fabric or warp ends due to changes in their moisture content due to their specific treatment or imperfections in their manufacture, so as to permit my entire apparatus and method to function continuously without stoppage, occupying a minimum amount of floor space and eliminating a large portion of the labor formerly thought inherently necessary with this type of process.

Further features of my invention relate to the specific details of electrical means I preferably employ for driving the various respective units and electrical means I preferably employ for their control.

As stated hitherto, I preferably construct all rotating parts of my apparatus with ball bearings so that the yarn or cloth will be pulled therethrough with a minimum amount of friction and I provide the sensitive dancer roll control both in the dancer rolls and slack accumulator to lessen the strain on the yarn or fabric in sheet form.

A further feature of my invention relates to the improved type of specific means I preferably employ for positively driving the yarn or fabric in sheet form through the dye vat or size vat. For this purpose I preferably employ a plurality of rolls between which runs of cloth are adapted to pass and I positively drive all said rolls insofar as possible at substantially the same peripheral speed so as to permit no friction upon the fabric or yarn between the rolls other than the out and out straight pressure leverage normally employed therein and thereby eliminate frictional distortion or markings thereon or any strain on the cloth or fabric when passing therethrough, and I preferably make this means resiliently automatically adjustable to automatically compensate for variations in the thickness of the fabric or for wear on the rolls in use, or I may if desired, in place of making said means automatic provide an adjustable take-up for the slack therein. Therefore I believe I am the first to provide a positive peripheral speed for all rollers in a group acting on a continuous sheet of fabric, employing a chain and sprocket drive for this purpose with either a resiliently automatic and/or an adjustable take-up therein, it being obvious that this type of control may be employed in other types of controls for a plurality of fabric abutting or gripping rolls other than the specific type of squeeze rolls shown respectively in the dye vat and sizing tank herein.

These and such other objects of my invention as may hereinafter appear will be best understood from a description of the accompanying drawings which illustrate various embodiments thereof.

In the drawings, Figs. 1, 2 and 3 are continued side elevations of an improved embodiment of my apparatus specifically shown for dyeing warp threads in sheet form in which the warp threads are split and separately dyed in three separate vats to provide a plurality of stripes in the warp and in which the warp threads are simultaneously sized as they are dyed.

Figs. 4, 5 and 6 respectively are plan views of the embodiment of my invention shown in Figs. 1, 2 and 3.

Fig. 7 is a diagrammatic view illustrating the slack accumulator and showing the motor for the batching unit and the various motors for the continuous dyeing apparatus and the means I preferably employ for controlling the various motors both through the slack accumulator and through gravity actuated means controlled in its height by the slack between units for the various dyeing and treating units of the apparatus.

Fig. 8 is a face view of the full field rheostat shown in Fig. 7.

Fig. 9 is a side elevation of the rheostat shown in Fig. 8.

Figs. 10 and 11 are continued side elevations of portions of a different embodiment of my invention employing instead of size in the dye vat (not shown but similar to that shown in Fig. 1) as in the embodiment shown in Figs. 1, 2 and 3, a separate slasher or vat for sizing material after the dyestuff has been applied to the warp ends and the warp ends suitably dried and aged and thereby elongating the length of the unit so as to apply the dye and size separately and providing a similar slack accumulator between the size drying means and the batching means as employed in my preferred embodiment between the ager and batching means.

Figs. 12 and 13 are plan views respectively of the embodiment of my invention shown in Figs. 10 and 11.

Fig. 14 is an enlarged side elevation of the squeeze roll mangle I preferably employ in either the dye or size tank, illustrating in detail the means I preferably employ to positively drive the respective rolls thereof and automatically adjust for wear on the rolls and to provide a certain amount of resiliency or give between the rolls in case an obstruction should attempt to pass therethrough.

Fig. 15 is a horizontal sectional view of the automatic take-up I preferably employ in connection therewith taken along the line 15—15 of Fig. 14.

In the drawings, wherein like characters of reference indicate like parts throughout, 20 generally indicates a dyeing and treating apparatus constructed in accordance with my invention.

While certain of the chemical features of my invention may be employed independently of the apparatus shown, I have specifically constructed an apparatus for carrying out my improved method, which so far as I am aware is the best known for employing the specific chemical features I preferably employ and for this reason in order that my method may be best understood I will first describe, the construction of and functioning in detail of the improved apparatus I preferably employ.

As my improved apparatus is particularly adapted for dyeing warp threads in sheet form I will first describe the operation thereof in connection therewith. Broadly speaking, my invention includes a series of fabric, either warp or cloth, or other web, dyeing and treating units, in my preferred embodiment, driven continuously by individual motors in proportion to the slack between the respective units, an intermittently driven batching or loading apparatus and means for accumulating slack between the intermittent batching apparatus and the continuous dyeing and treating apparatus while the batching apparatus is being loaded or unloaded so that the dyeing and treating apparatus may run continuously. Between successive units of the dyeing and treating apparatus I provide preferably gravity actuated means to control the means for driving each individual unit thereof in proportion to the slack between successive units and in the preferred embodiment of my invention shown in Figs. 1–9 I preferably employ a combined dyeing and sizing unit, a drying unit and an ageing unit. I may, however, as shown in Figs. 10–13 only dye in the dyeing unit and after ageing separately size and dry prior to accumulating slack for intermittent batching. In my preferred embodiment I provide means, such as the stands 22, for holding a plurality of warp or yarn beams 24, each containing the desired number of ends so that when combined together as later described, they will form a warp or yarn beam of the desired number of ends for weaving. I then provide a plurality of warp or yarn dye units 26ª, 26ᵇ and 26ᶜ (three as shown), each including the respective sets of padding squeeze rolls, in the embodiment shown placed one above each other, 28ª, 28ᵇ, 28ᶜ to draw the fabric through the respective dye vats 27ª, 27ᵇ, and 27ᶜ and squeeze the excess moisture therefrom in such a manner that the warp ends or fabric will be relieved of all strain insofar as possible. I provide suitable means, such as the individual motors 30ª, 30ᵇ and 30ᶜ to individually drive the respective squeeze rolls 28ª, 28ᵇ and 28ᶜ. While I employ the sets of squeeze rolls 28ª, 28ᵇ and 28ᶜ in my preferred embodiment it is apparent that other types of rotatable or driven means may be employed for driving the fabric or yarn ends through the dye vats. Where a plurality of stripes are desired in the finished warp, the threads are separated prior to dyeing by the serrated grouping bars 31ª, 31ᵇ and 31ᶜ into the desired stripes so that when later combined by the guide rolls 32 after dyeing they may form the composite stripes of warp before weaving prior to the passage of the combined warp or yarn 34 around the drying cans. The sized or dyed threads may then be separated as usual so they will not stick together by the separating bars 40, led over driven guide rolls 42 driven by suitable belt means 44 driven by the same means 38 which drives the drying cans 36 or other drying means employed and led into the ager 46. The rotatable drying cans 36 thus form rotatable means to draw the combined warp sheet through the drying means 37, and the motor 38 with gearing 39, etc., forms means to drive said rotatable driving means. The ageing means 46 preferably includes rotatable means 48 for drawing the warp in a sinuous course in sheet form therethrough. In my preferred embodiment the rolls 48 include the upper rolls 50 over which individual runs of fabric are adapted to pass and the lower rolls 52 under which the runs of fabric are adapted to pass to provide a sinuous up and down course of travel of the fabric through the ager 46. In the embodiment shown the upper set of rolls 50 and lower set of rolls 52 may be driven by the continuous chain 53, which is suitably driven by the gearing, pulleys, etc., 54 driven by the electric motor 56. The guide drive rolls 58 are also provided for the fabric after leaving the ager driven at the same speed as the rolls of the ager by driving means 60 driven by the driving means 54 for the ager rolls. Means are provided to introduce steam within the ager, which may comprise the ageing steam chambers 62 in the top of the ager and the perforated steam pipe 64 in the bottom thereof. Means are also provided in my preferred embodiment to introduce volatile acid fumes within the ager, said means as shown comprising a volatile organic acid tank 66 provided with a drip valve 68 to drip the volatile organic acid into the steam pipe 64 so that volatile organic acid fumes may be formed therein and discharged through the perforations 65 with the steam in the steam pipe 64. It is thus obvious that the upper and lower aligned sets of rolls 50 and 52 provide means to draw the warp or yarn in sheet form in a sinuous course through the ager and the driving means therefor comprises the electric motor 56, the connecting gearing, etc., 54 and the continuous drive chain 53 and that the acid tank 66 and drip valve 68 provide means to introduce volatile organic acid fumes within the ager and the pipe 64 and chambers 62 provide means to introduce steam within the ager.

In the composite apparatus shown in Figs. 10–13 after the fabric has been suitably passed through the ager, it is then led through a supplemental sizing means 71, including rotatable means such as the squeeze rolls 70 to draw the warp in sheet form through the size vat 72 thereof and means to drive said rotatable means including the electric motor 74 and attached belting and shafting 76. In the embodiment shown in Figs. 10–13 I then pass the fabric through the second drying means 78, which includes the rotatable drying cans 80 driven by a constant speed electric motor 82 to drive through suitable gearing 84 the drying cans 80. It is thus apparent that the drying means 78 includes the rotatable drying cans 80 to draw the fabric or warp in sheet form therethrough and the means 82—84 to drive said rotatable means at constant speed.

It is thus obvious that I have provided in the embodiment shown in Figs. 10–13 a dyeing and treating apparatus adapted to be continuously run to draw the fabric therethrough including a dyeing unit 25 composed of the individual units 26ª, 26ᵇ and 26ᶜ, a drying unit 37, an ageing unit 46, a sizing unit 71 and a drying unit 78. As stated hitherto, each unit in my preferred embodiment is separately driven, by means of the individual motors 30ª, 30ᵇ and 30ᶜ for the respective dyeing units 26ª, 26ᵇ and 26ᶜ, the motor 38 for the drying cans 36, the motor 56 for the ageing unit 46, the motor 74 for the separate sizing means 71 and the motor 82 for the separate drying unit 78. The last unit in the series of dyeing and treating units is adapted to be driven at a constant speed, namely as in the embodiment shown in Figs. 10–13 the drying unit 78 by the motor 82 and the ageing unit 46 driven by its motor 56 in the embodiment shown in Figs. 1–9, and I provide means positioned by the slack between units for driving the other respective motors at speeds reversely proportionate to said slack to compensate for the stretch or shrinkage which takes place in the fabric warp or yarn due to imperfections in the fabrication thereof, shortness of the fibres employed or changes which take place in the length of the fabric warp or yarn due to temperature or moisture changes in the fabric warp or yarn which successively take place in the dyeing and treating apparatus. As the different parts thereof are substantially similar for each unit I will use the same reference characters for each unit and specifically describe one. For this purpose I provide gravity actuated means positioned by the slack between units for controlling the speed of the respective motor for driving the next prior unit in the dyeing and treating apparatus. Thus, for instance, for driving the motor 74 for the sizing unit 71 shown in Figs. 10–13, I provide the dancer roll 84 adapted to reciprocate up and down vertically in the guides 86 in proportion to the amount of slack in the yarn or fabric between the second drying unit and the sizing means shown in Figs. 10–13. Cord or chain means 88 are attached to the dancer roll 84 and passed over a pulley or sprocket gear 90 on the pulley shaft 92 of the rotor arm 94 of the sizing motor rheostat 96. The rotor arm 94 is provided with the usual contact 98 adapted to contact the respective contacts 100 on the rheostat stator portion 101. Said contacts 100 are connected with the motor 74 through resistances of different amounts varying with the particular contact contacted, as is usual in rheostats. In practice the cord means 88 comprises a chain 88 which fits over the sprocket 90 on the rotor drive shaft 92 and is provided with the counter-weight 102 to move the rotor of the rheostat as the fabric slackens as the slackness of the yarn or fabric varies. The dancer roll 84 is substantially counter-balanced however, by the weight 102 so that the dancer roll and rheostat may readily return to their initial position as the slack of the fabric varies, without substantial strain. I have described the dancer roll, rheostat construction 84—96 in such complete detail as the exact construction is used for the dancer roll 84, rheostat 96 for the drive motor 56 for the ager, the dancer roll 84 and rheostat 96 for the first drying means motor 38 and the individual dancer rolls 84ª, 84ᵇ and 84ᶜ, and rheostats 96ª, 96ᵇ and 96ᶜ, respectively for controlling the individual motors 30ª, 30ᵇ and 30ᶜ, for controlling the speed of the individual dyeing rolls 28ª, 28ᵇ and 28ᶜ in proportion to the slack between each individual dyeing vat unit 26ª, 26ᵇ and 26ᶜ and the drying means 37. In place of the specific electrical means employed any type of means controlled by the slack between the last mentioned drying means and the slashing or sizing means to control the speed of the rotatable slashing means driving means, means controlled by the slack between the slashing means and the ageing means to control the speed of said ageing means driving means, means controlled by the slack between the ageing means and first mentioned drying means to control the speed of said rotatable drying means driving means and means controlled by the slack of the respective warp or filling threads between said first mentioned drying means and said individual dye vat units, to selectively control the speed of said rotatable dye vat squeeze rolls, may be employed, whether mechanical, electrical, or otherwise.

Thus in my preferred embodiments, both as shown in Figs. 1–9 and 10–13, the dyeing and treating apparatus comprises a series of dyeing and treating units, the latter one in the series being driven at constant speed and the prior ones in the series being driven by means controlled in its speed by the slack between said unit and the one located just behind it. Where intermittent loading is done, it is obvious that the unit nearest the loading unit will be driven at constant speed.

If desired, instead of selectively dyeing different warp or filling ends different shades in the respective dye vat units 26ª, 26ᵇ and 26ᶜ, these may be entirely dyed from a single beam in a single dye vat controlled by a single motor 30 controlled by a single dancer roll 84 rheostat 96 control of the type just explained in detail for the sizing means control in the embodiment of my invention shown in Figs. 10–13.

In the embodiment of my invention shown in Figs. 1–9 the warp ends are sized simultaneously with dyeing and in this instance the separate size bath 71 and cooperating drying means 78 may be dispensed with as shown, and as shown the last motor in this series, namely, the ager motor 56 is driven at constant speed. It is apparent, however, that insofar as certain features of my invention are concerned that the dyeing and treating units may consist of any number of different kinds of units or in fact, any type of a web treating unit.

I provide suitable batching or loading means 104 which may insofar as certain features of my invention are concerned may be either a loading or an unloading means in which case the relative controls are varied accordingly. I also provide slack accumulating means 106 interposed between said warp beaming or batching or loading means 104, and in my preferred embodiment the last unit of the dyeing and treating apparatus, whereby slack may be accumulated in the slack accumulating means during the intermittent running of the batching means or removal of warp beams where warp is employed to permit the continuous operation of said web treating or warp dyeing and treating apparatus. I preferably employ means 105 manually controlled as at 103 to drive said warp beaming means 104 at a greater speed than said respective warp dyeing and treating apparatus to normally diminish the slack in said slack accumulating means and I provide means controlled by the amount of slack in said slack accumulating means when said slack has reached a predetermined minimum to control the speed of the warp beaming means driving means 105 to bring it in substantial synchronism with the speed of said warp dyeing and treating apparatus. I also provide suitable means, such as the limit switch 110 operative when said slack in said slack accumulating means has reached a predetermined maximum to stop the operation of said warp dyeing and treating apparatus, and means, such as the limit switch 112 operative when the slack in said slack accumulating means 106 has reached a predetermined minimum to stop said warp beaming means driving means 105, said last two means, including the limit switches 110 and 112, being if desired, operative to start said respective warp dyeing and treating apparatus and warp beaming means when the slack in said slack accumulating means has again come within said respective maximum and minimum limits. I may, if desired, provide means, such as the manually controlled rheostat 114 (Fig. 7) for varying the speed of all said warp dyeing and treating units and means such as the control box 116 and switches 117 for manual control of all said driving means.

While any suitable type of means may be employed for this purpose, in my preferred embodiment, I preferably construct my improved slack accumulating means as follows: In the preferred embodiment of my invention shown, the batching or loading means comprises a usual warp winding device 104, comprising a motor 105 which suitably drives by friction the warp beam 107, the warp beam slipping over the driving rolls 109 to provide the necessary friction drive for the same, for the peripheral speed of a point on the beam varies as the diameter of the beam varies as it is built up in use. I provide a novel type of slack accumulator 106 per se adapted for use between web treating units, one of which is to operate continuously having preferably electric driving means therefor and the other of which is an unloading or loading unit designed to operate intermittently having an electric motor for driving it at a different speed than the speed of said continuously operated unit, comprising a set of preferably aligned rolls 120 over which runs of web are adapted to individually pass, suitably mounted on the stand 122 preferably depending from the ceiling 124, a carriage 126 constrained to reciprocate up and down in a vertical plane, preferably by means of the vertical rods 127 passing therethrough having a set of preferably cooperating horizontally aligned rolls 128 under which runs of web are adapted to pass mounted thereon staggered in respect to vertical planes in respect to said upper set of rolls 120, thus providing a sinuous up and down course for the runs of web individually over the respectively aligned rolls 120 and under the respective aligned rolls 128 and providing a sinuous course for the web through the slack accumulating means 106. In my preferred embodiment the carriage is balanced by the cord or chain means 130 which passes upwards over the pulleys or sprockets 132 and are attached to the counterweights 134 which reciprocate in the guides 136 to balance the weight of the carriage 126. It is apparent therefore that the carriage 126 of its own weight will drop to hold the accumulated slack taut between said sets of rolls 120 and 128 and is counter-balanced by the weights 134 to rise as said slack is taken up to exert a light tension only on said web on rising or falling thereof.

I have found in practice that the type of slack accumulating means just described would not work efficiently unless the slack were boosted by one of the rolls 120ª preferably by a roll near the center of the aligned rolls 120. In my preferred embodiment the center roll 120ª is suitably driven or boosted by a belt 138 driven by a pulley 139 on one of the driven nip guide rolls 58 or 141 driven by the last motor in the series of fabric dyeing and treating units at the constant speed of said unit. This booster mechanism therefore tends to drive the center roll 120ª to positively assist in accumulating slack between said sets of rolls 120 and 128 in use. It has been found in practice that without this booster with such a large number of rolls as shown the slack accumulator will not function as successfully. The booster means just described therefore comprises means driven by said electric means to rotate a center roll of said upper set of rolls to assist in accumulating slack evenly in said accumulator.

As hitherto explained, in the preferred embodiment shown, the motor 105 is normally driven to give the fabric or yarn being wound on to the beam 107 a greater speed than that of the yarn or fabric being transmitted from the last unit of the dyeing and treating apparatus. In the preferred embodiment shown more particularly in Fig. 7, to synchronize the speed of the batching unit 104 with that of the treating unit, I preferably employ a full-field rheostat 140 which is provided with a suitable number of contact points 142 and connected resistances to cover the entire range of speeds of the electric motor 105. The rheostat 140 for controlling said intermittently operated motor 105 is mounted as shown above the slack accumulator 106 and cord or chain means 144 are provided to rotate its rotor, in my preferred embodiment, comprising a chain 144 adapted to fit over a sprocket 146 and rotate the rotor shaft 148 and rotor arm 150 containing the usual contact 151 for contact with the respective variable speed contacts 142 in the stator of the rheostat.

One end of the said cord means 144 is provided with a weight 152 mounted on a vertical shaft 154 and constrained to move in a vertical plane thereby and is adapted to be raised by the carriage 126 to rotate said rheostat rotor. The counterweight 156 is mounted on the opposite end of said cord means 144 thus adapted to rotate said rheostat rotor to bring said intermittently operated motor 105 into substantial synchronism with said continuously operated electric driving means for said dyeing and treating apparatus when the slack in said slack accumulating means 106 reaches a predetermined minimum. It is obvious that as the weight 152 is moved up and down by the carriage, that the entire carriage 126 and attached rolls 128 function as a dancer roll to move the rotor arm 150 over the respective contacts 142 of the rheostat stator to vary the resistances in said rheostat to vary the speed of the motor 105 driving the warp beaming or web-loading means in proportion to the height of the carriage 126, in reverse proportion to the slack, during the uppermost portion of the carriage travel, prior to its dropping below the weight 152. Means, such as a collar 160 is provided on said shaft 154 to limit the dropping movement of said weight 152 and hence range of said rheostat as the carriage 126 is lowered with the stoppage of the intermittently operated motor 105. The carriage is so designed that it will drop from a position above the collar 160 to a lower position higher than its extreme lowermost position while the batching apparatus 104 is being loaded and a new beam being placed thereon. After the new beam has been placed thereon and the motor started, the full-field of the rheostat will be given the motor 105 thereby driving the motor 105 to drive the fabric or yarn batching means at a faster speed than that of the fabric treating apparatus so as to, in a relatively short period of time, raise the carriage so that it may contact the weight 152 to synchronize the speed of the loading unit with that of the treating apparatus and to permit the carriage 126 to function as a dancer roll to vary the speed of said motor 105 to equalize it with that of said treating unit driving means and to compensate for slack between said units in similar fashion as the dancer roll 84 and rheostat 96 function over a limited range to equalize the speed in proportion to the slack to tend to drive the respective units at the same speed.

As stated, the limit switches 112 and 110, are preferably provided and mounted so as to be contacted respectively by the vertically reciprocal carriage 126 to respectively stop the electric means for driving the continuously operated unit and the motor for driving the intermittently operated unit at predetermined respective minimum and maximum slack accumulating positions of said carriage 126, the suitable electrical connections therefor being diagrammatically illustrated in Figure 7. If desired said limit switches may be constructed to automatically start said respective driving means as the slack in said slack accumulator 106 again comes within said maximum and minimum limits. In my preferred embodiment the limit switch 112 functions automatically to again start the batching unit, but inasmuch as there is danger to an operative wandering into a portion of the dyeing and treating apparatus, this is preferably started up by hand by means of a suitable control button or switch 117 connected through the control box 116. As stated the manually controlled rheostat 114 is also provided to simultaneously vary the speed of all the motors in said main web treating continuously operated means. Suitable controls 117 are provided for starting, stopping and varying the speed of said continuously operated warp-treating unit. If desired a separate control box 166 may be provided for the intermittently operated batching unit or it may be combined with the main control box 116.

The rheostats 96 controlled by the dancer rolls 84 in the dyeing apparatus units have a variation of from 10 to 15 per cent in the field and all motors on the master control should have matched fields. In the accumulator, however, I employ a full-field rheostat specially designed for this purpose covering the full range of the motor, controlled by the lower carriage as a dancer roll. It is believed that a rheostat operating over a full range of a motor controlled by a dancer roll is new as most rheostats have been limited to a variation of field of 15 per cent. between units.

The features of my invention hitherto described have to do with a slack accumulating means located between a continuous web-treating unit and an intermittent loading and unloading unit. If the unit 104 were a loading unit instead of an unloading unit and the slack accumulator were placed in front of the web-treating unit instead of behind it, it is obvious that it and its respective motors would have to be so set up, constructed and connected as to function in a reverse fashion.

While I have shown my improved type of slack accumulator between a warp-treating and dyeing apparatus and a batching unit, it is obvious that it may be located between any types of units such as between a tenter or dryer and batcher or calender and so forth, and such a device has been used in this connection successfully throughout the applicant's assignee's plant.

It is obvious therefore that independently of the specific chemical method employed that I have provided not only a novel apparatus but also a novel type of method for continuously dyeing, sizing, ageing and treating warp in sheet form or fabric, and, if desired, intermittently loading and/or unloading the same, provided with suitable safeguards against accident or any danger whatsoever to the fabric or warp in the course of its treatment. The entire apparatus is constructed so as to maintain the fabric or warp in sheet form continuously through the process and to provide a minimum amount of strain longitudinally on the fibres thereof, and for this purpose the independent dancer roll control has been provided as well as the tender type of feed roll drive, etc. At the same time instead of driving through a common drive shaft, each respective unit thereof is independently driven and provision is made between each unit for automatically taking care of any stretch or shrinkage of the fabric, so that the fabric will not tend to clog up the units or break between units. It is believed that by means of this automatic control the continuous operation of dyeing and treating warp or fabric shown herein has been rendered practical for the first time. It is also apparent that I have so designed the intermittent loading and/or unloading feature of my apparatus that the dyeing and treating may take place continuously without any stoppage thereof to spatter the goods with roll marks or dye streaks.

As stated hitherto, I preferably so construct my entire apparatus that the sheets of yarn whether warp or filling or fabric may be readily pulled therethrough with substantially no strain thereon and for this purpose I preferably rotate all rotatable parts of my apparatus rotated by the fabric in its passage therethrough on ball bearings. In order to ease any further strain on the sheet of yarn or fabric passing therethrough, I preferably provide mangles for the respective dye and size vats, each consisting of a set of three rolls between which runs of the sheet of yarn or fabric are adapted to pass in order to evenly and positively pull the fabric through the dye vat and/or sizing tank without any substantial strain thereon. In my preferred embodiment in order to more fully lessen the strain, I preferably, as shown in Fig. 14, provide means to positively rotate all the squeeze rolls 28 in each respective vat or tank at substantially the same peripheral speed and provide suitable means to drive them for this purpose. As shown in Fig. 14 the sets 28 of squeeze rolls comprise a center roll 170 having a gear 172 on one end thereof adapted to be rotated by the gear 174 on the stub shaft 176 which in turn is rotated by the sprocket gear 178 rotated by the chain 180 driven by the respective drive motor 30. A squeeze roll 182 is provided immediately above the squeeze roll 170 and a squeeze roll 184 is provided immediately below it. These rolls are maintained in fabric abutting relationship by means of the compound leverage system 186, including the weight 188 as is common in such types of devices. Each of said rolls 170, 182 and 184 is provided with a sprocket gear 190 on one end thereof, and to positively drive each of said rolls I provide the chain or cord means 192, the chain 192 positively engaging each one of these sprockets to positively drive the upper and lower rolls 182 and 184 respectively from said center roll 170. It is obvious, however, that in place of the sprocket 190 and chain 192 other types of pulley means may be mounted on the roll shafts and other types of cord drive means may be employed. I also provide either adjustable or resilient means to abut the chain 192 to automatically or otherwise maintain said chain taut with variations in the thickness of the fabric passing between said rolls and as said rolls wear down in use. For this purpose I provide the bracket 194 projecting laterally from the roll frame 196 having the spaced side walls 198 having the aligned longitudinal slots 200 therein each aligned respectively with the slot in the opposite respective side wall 198 and in my preferred embodiment I provide each side wall with the stationary rack means 202 mounted thereon adjacent said slot 200. I provide two sprocket gear shaft bearings 204 slidably mounted in each of said slots 200 to receive the sprocket gear shaft 206. Said sprocket gear shaft 206 is preferably provided with a sprocket gear 208 mounted centrally thereof adapted to enmesh the chain 192 and is provided with the pinion gears 210 adapted to enmesh the stationary racks 202 on said bracket 194 adjacent said slots 200. I also provide a U-shaped yoke 212 having each arm secured to or abutting said slidable bearings 204 and spring means 214 interposed between the base 216 of said yoke 212 and the adjacent portion 218 of the bracket 194. It is obvious that with this construction I have provided the automatically adjustable sprocket 208 provided with the bearings 204 maintained at all times in a plane parallel to that of the chain 192 by the spring 214. It is thus obvious that as the rolls 170, 182 and 184 wear down in use that the sprocket 208 will automatically adjust itself and compensate therefor and will also yield to permit passage of substances between the nips of the respective rolls and that the bearings 204 may be provided with means to adjustably secure them at spaced intervals longitudinally of said slots 200 other than the spring means shown to adjustably space them therein on changes in conditions of treatment. It is thus apparent that with this improved device or attachment for positively driving the respective squeeze rolls the fabric or yarn may be passed therethrough without any substantial amount of strain or friction thereon apt to cause a tearing or frictional markings or distortions thereof. It is also obvious that in place of the specific squeeze rolls shown located above a treating bath that this feature of my invention may be employed where any sets of squeeze or other rolls are employed.

It is thus apparent that with this positive drive of the squeeze rolls, the automatic dancer roll control and the ball bearings that the rolls may be so readily rotated and the speed thereof controlled that it will be possible to pass a very few strands of yarn or very tender fabric through my improved apparatus without causing any strain thereon or causing breakage thereof. With these features my apparatus is particularly adapted for use in treating yarn in sheet form and particularly for dyeing yarn in sheet form whether it is supplementally sized or not. Due to the above features, it is obvious that even with sheets of filling yarn with their lighter weight and less twist even than warp yarn, it is possible to dye long lengths thereof in an extremely satisfactory manner and in a more satisfactory manner than any known hitherto and insure a quick delivery of the same and that the dyeing will be even from end to end. It is also apparent that the second sizing tank may be used even in treating filling yarns where a dyeing after treatment is desired, such as a second acid bath to more quickly develop the indigosols or oxidation bath for the aged vat dyes or other baths for the respective dyes employed.

While the improved embodiment of my apparatus shown may be used in dyeing warp or filling yarn or fabric or sizing and drying the same, it is particularly designed for use with a type of dye in which a dye ingredient is added in a dye vat and which is later after-treated to form and affix the dye-stuff upon the fabric. As stated hitherto, while the sizing may be done as shown in Figs. 10-13 after the dyeing and ageing has been completed on the warp or fabric, my apparatus is preferably so designed to be adapted to be used as shown in Figures 1-9 for treating warp ends with a size and with the dye ingredient simultaneously. My improved apparatus and method are designed and adapted especially for use in dyeing yarn or fabric with indigosols, namely, ester-like derivatives of vat dyestuffs or rapidogens which are preferably a mixture of a naphthol and a diazo base bonded with an anti-coupling agent. In dyeing with either one of these types of dyes, it is necessary to split something off the stabilized dye ingredient in order to have the insoluble dyestuff function to become soluble and combine to form a dye ingredient capable of being taken up by the yarn or fabric and which then or later may turn into the actual dyestuff. It may, however, be employed with other types of dyes and may even be employed with vat dyestuffs in paste form or any type of oxidizable dye such as an aniline black or a di-phenyl black. In the broader aspects of my invention it comprises the method of treating fabric or yarn ends in sheet form, which consists of arranging the ends in sheet form, continuously moving the fabric or warp ends in sheet form while subjecting it to the following treatments, namely, if desired, as shown in one embodiment of my invention, simultaneously treating the moving fabric with size, dye ingredient incapable of permanent dyeing without after-treatment and penetrant each of which has no appreciable effect on the functioning of the other, drying the fabric, if desired, after the application of the dye ingredient, treating the moving fabric under suitable conditions of heat and a reagent capable of initiating the dyeing reaction, directing the course of the moving fabric and controlling its conditions of treatment to further complete the dyeing in the moving sheet of fabric or warp and, if desired, as hitherto explained, then intermittently packaging the fabric units in sheet form for further manipulation while during the stoppage of the packaging or loading unit automatically intermittently accumulating slack in the moving sheet of fabric to permit the fabric to continuously move through its hitherto described continuous treatments. In the preferred embodiment of my invention, employing as a dye ingredient an indigosol or a rapidogen, after the application of the dye ingredient, I preferably treat the moving fabric or warp in sheet form in an ager with steam and with volatile organic acid fumes under suitable conditions of heat to split off at least a component part of said dye ingredient to permit the remainder to react to initiate the formation of the dyestuff on the fabric and direct the course of the moving fabric or yarn and control its condition of treatment to further complete the dyeing.

I have therefore discovered that rapidogens or indigosols may be applied in a continuous sheet of yarn or fabric and if after-treated in an ager with steam and with volatile organic acid fumes that a component part of the indigosol or rapidogen will be broken off to permit the remainder to react to initiate the formation of the dyestuff on the fabric or yarn. So far as I am aware, no one has done this for continuous piece dyeing of an entire fabric or the continuous dyeing of warp or filling yarn ends in sheet form. Insofar as the apparatus is concerned, it means merely adding a volatile organic acid tank to the ager and treating the fabric either continuously as shown in my preferred embodiment or otherwise.

Indigosols are broadly ester-like derivatives of leuco compounds of vat dyestuffs. The acid fumes split off the ester and form a soluble leuco compound which in turn is dissolved by the steam and moisture present and impregnated on the yarn or fabric. An oxidizing agent is usually added with the indigosol which then immediately starts to function to turn the leuco compound into a vat dyestuff to reform it as a vat dyestuff on the fabric.

When dyeing with a rapidogen which is a mixture of a naphthol preferably one of the AS group and a diazotizable base bonded with an anti-coupling agent, the acid fumes function to split off the anti-coupling agent, to permit the diazotizable base to couple as usual with the naphthol to form the diazo dyestuff on the fabric.

Where employing a vat dyestuff, a suitable reducing agent is added in the dye vat bath, the steam in the ager then functions as usual to reduce the vat dyestuff paste or powder to its leuco compound which is soluble, and will become dissolved on the fabric and will later on exposure to the air or other oxidizing treatment become oxidized on the fabric into the original vat dyestuff, such being substantially the normal process of dyeing with vat dyestuffs. So far as I am aware, however, this process has never been employed for simultaneously sizing and dyeing warp or filling yarn threads in sheet form and is greatly enhanced by the use of the penetrant I employ which has no effect on the functioning of the dye ingredient or the size. When dyeing with a suitable oxidizable dyestuff such as aniline black, di-phenyl black, etc. which may be done with or without the simultaneous application of size, a suitable oxidizing agent is added which starts to function to oxidize the dye ingredient into the desired dyestuff on the fabric.

While any one of the generic classes of dyestuffs hitherto referred to may be employed I will now proceed to give the approved types of formulae which I use in specific instances in dyeing with these various colors. When dyeing and simultaneously sizing with an indigosol derivative of jade green (di-methyloxy dibenzanthrone—Color Index #1101—), the indigosol being the ester of the leuco compound of the well known jade green, to 750 parts of cooked size, starch or gum (1 lb. to 1 gal.) I add 10 parts indigosol green IBA, 20 parts of solvent (glycene A), (ethylene thio-glycol), 205 parts of hot water, 5 parts of urea which functions as a solvent and stabilizer, 5 parts neutral sodium-chromate, which functions as an oxidizing agent to be released as chromic acid by the organic acid and 5 parts of penetrant such as gardinol WA (sulphonated synthetic higher aliphatic alcohol such as lauryl or oleyl), (in place of gardinol any suitable type of sulphonated fatty alcohol such as crysylic acid or other phenolic compound having no deleterious effect on any other ingredient may be employed), making up a thousand parts of solution.

may be boiled or dropped on a hot plate to supply the acid fumes to split off the ester and allow the oxidation of the color to its respective vat dyestuff.

When employing rapidogens, to 750 parts of cooked size, starch or gum, preferably British gum, I add 30 parts rapidogen red G. This color is a mixture of naphthol ASD (ortho-toluidine of beta oxy-naphthoic acid) and fast red KB base (4-chlor 2-ammino toluene hydrochloride) bonded with an anti-coupling agent which may be either sarcosine (CH₃—NH—CH₂—COOH) of the aliphatic series, or a compound similar to 2 amino 4 sulpho benzoic acid of the aromatic series or other anti-coupling compounds.

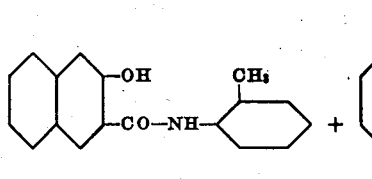

Naphthol ASD··      Fast red KB base      Diazo dye

This formula includes sarcosine as an anti-coupling agent but it may include any other

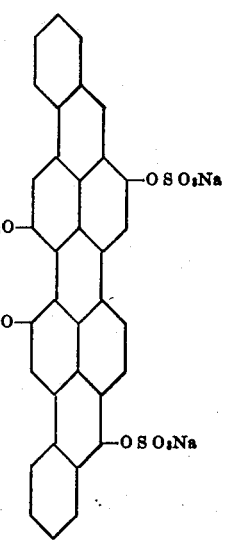

Indigosol green IBA     (Jade) green leuco compound     Jade green (oxidized)

Disodium salt of disulphonic acid ester of dihydro-dimeth-oxy-dibenzanthrone      Dimethoxy - dibenz-anthrone $C_{16}H_{10}O_4$ As diagrammatically illustrated when treated with the volatile organic acid fumes, the ester splits off and the sodium salt of the leuco compound is formed which in turn is oxidized by the oxidizing agent employed into the jade green in accordance with the above formula.

To supply the volatile organic acid fumes in the ager I preferably employ any type of a volatile organic acid such as formic or acetic acid. The acid is preferably allowed to drip into the steam at the rate of approximately 3½ gallons per hour and the steam is preferably at 30 lbs. pressure. In place of allowing the hot acid to drip into the steam to form the acid fumes, these may be formed in any suitable manner as for instance, the hot acid solution suitable compound. The reaction is believed to take place as follows:—The sarcosine splits off and the diazo bond is bonded to the No. 1 carbon atom. The naphthol and the diazotizable base then combine as just explained according to the above formula to form the insoluble diazo dyestuff on the fabric. To this mixture I add 35 parts of cellosolve (ethylene glycol mono-ethyl ether) as a solvent, 125 parts warm water, 8 parts caustic soda 72° Tw., 57 parts of water and 5 parts penetrant, namely BP solvent which is a mixture of pine oil and sulphonated oil.

In dyeing according to either one of these processes the yarn or fabric in run through the proper solution in the slasher, dried on the slasher-cans, developed by a treatment of volatile organic acid fumes as heretofore explained in the ager which completes the development of the color and it is thus only necessary to wind the dyed yarn on a warper beam or bobbins prior to weaving. In dyeing fabric or filling yarn with either one of these generic types of dyestuffs, it is obvious that the size and penetrant may be omitted, the formulae for dyeing the fabric being essentially the same.

In dyeing with a vat color for a 50 gallon batch of size, add 12½ lbs. of indanthrene blue GCD (3.3' di-chloro-N-di-hydro-1-2-1'-2' anthraquinone azine, Color Index #1113) dissolved in hot water, 20 gallons of British gum, (3 lbs. per gallon) 4 gallons gum tragacanth (8 ounces to a gallon), 2 gallons gum arabic (2 lbs. per gallon), 32 lbs. sodium sulphoxylate formaldehyde, ($Na-HSO_2-CH_2O-2H_2O$) 47 lbs. of potash $K_2CO_3$, 1½ lbs. of caustic soda 52° Tw., 1½ gallons of penetrating oil such as BP solvent (a mixture of pine oil and sulphonated oil), and 2 gallons of glycerine making up 50 gallons. The potash and caustic soda are dissolved in water, the mixture is warmed to 120° Fahrenheit and the sodium sulphoxylate formaldehyde added. The color is dispersed in hot water, the potash is added to the mixed dye and sodium sulphoxylate formaldehyde and the dispersed color and all the other chemicals are added. The fabric or warp is then passed through this combination of slashing and dyeing baths, suitably dried and treated in an ager with steam as usual, when the sodium-sulphoxylate formaldehyde mixture will function with the action of the steam at this high temperature to reduce the indanthrene blue GCD paste to its leuco compound which will immediately be dissolved by the steam, impregnated on the fabric or yarn and after its impregnation, initiation of the oxidation thereof to reform its respective vat dyestuff on the fabric will take place, thus reforming as usual the vat dyestuff on the fabric or yarn. So far as I am aware, I am the first to simultaneously size and apply a vat dyestuff to warp in sheet form in a continuous process of dyeing and ageing particularly in combination with a suitable penetrant which will have no effect on the functioning of the dye ingredient or vat dyestuff.

I will now give two examples of dyeing with an oxidizable color, namely, (1) di-phenyl black and (2) aniline black. 35 parts of di-phenyl black (para-amino di-phenyl amine) (Color Index #871) are dissolved in 55 parts acetic acid 90° Tw. and 22½ parts lactic acid, and 15 parts sodium chlorate. Just before use add 9 parts aluminum chloride 52° Tw., 5 parts of copper sulphide paste 30% to 15 parts water and 7 parts of vanadate of ammonium (solution 1-1000), and 3 parts BP solvent making up 500 parts.

In dyeing aniline black (Color Index No. 870), 6 parts of aniline salt, and 8 parts of aniline oil are mixed with 100 parts of water, to this are added 160 parts of chlorate of soda and 600 parts cooked size, to this are added 4 parts of vanadate of ammonium (1-128) solution and 7½ parts BP solvent, to 100 parts of water making 1500 parts. In either instance the vanadate of ammonium functions as a catalyst in the ager with the chlorate of soda to promote the oxidation to oxidize the di-phenyl or aniline black on the fabric or yarn.

The examples given have been for purposes of illustration rather than otherwise. As stated hitherto, I believe the process of continuously or otherwise treating fabrics or warps or filling yarns dyed with indigosols or rapidogens in an ager with steam and organic acid fumes to split off a stabilizing component thereof is broadly new both in the continuous treatment of yarn or full dyeing of the entire fabric in continuous form. Certain other features of my process as covered by the appended claims are broadly novel, irrespective of the specific type of dyestuff employed insofar as it consists of a dye which is incapable of a complete dyeing in a single treatment and preferably one added with the sizing solution. It is obvious, however, that as far as the sequence of steps of dyeing employed by me and the chemicals employed by me are concerned, that other apparatus may be employed to provide the novel sequence of steps thereof, but that my improved apparatus is particularly designed and adapted for use in the specific chemical treatment heretofore described for dyeing warp or filling yarns or fabric in sheet form for any of these types of dyes hereto described. It is obvious therefore, that I have provided not only a novel method of chemically dyeing but dyeing and simultaneously sizing warp in sheet form and applying well known types of fast and permanent dyestuffs to the warp in sheet form completely before weaving. I employ the word "fabric" in the claims to include warp or filling yarn ends in sheet form where the context so requires or admits as well as cloth or other fabric and I employ the word "loading" to also include unloading. I employ the word "web" to include any type of fabric in sheet form.

It is understood that my invention is not limited to the specific embodiments shown or methods described and that various deviations may be made therefrom without departing from the spirit and scope of the appended claims.

What I claim is:

1. In a dyeing apparatus, dyeing and treating apparatus including means for holding a plurality of warp beams, a plurality of dye vats, each including sets of padding squeeze rolls to draw warp threads from selected beams through its respective vat, and means to positively drive all said squeeze rolls at the same peripheral speed, and means to drive said means whereby warp ends from selected beams may be driven through the respective dye vats, means to combine said individually dyed warp ends into a common beam for weaving, drying means, including rotatable means to draw the combined warp sheet therethrough and means to drive said rotatable means, ageing means including rotatable means to draw the warp therethrough in a sinuous course, means to drive said rotatable means, means to introduce steam within said ageing means and means to introduce volatile organic acid fumes within, a sizing tank including a set of padding squeeze rolls to draw the warp therethrough and means to positively drive all said squeeze rolls at the same peripheral speed, drying means including rotatable means to draw the warp therethrough and means to drive said last mentioned rotatable means at constant speed, means controlled by the slack between said last mentioned drying means and sizing tank to control the speed of said rotatable sizing tank squeeze rolls driving means, means controlled by the slack between said sizing tank and ageing means to control the speed of said rotatable ageing means driving means, means controlled by the slack between said ageing means and first mentioned drying means to control the speed of said drying means driving means, means controlled by the slack of the respective warp threads between said first mentioned drying means and said individual dye-vats to selectively control the speed of said respective sets of rotatable dye vat squeeze roll driving means, warp beaming means, slack accumulating means interposed between said warp beaming means and last mentioned drying means whereby slack may be accumulated therein during the intermittent removal of warp beams to permit the continuous operation of said warp dyeing and treating apparatus disposed in front thereof and manually controlled means to drive said warp beaming means at a greater speed than said respective warp dyeing and treating apparatus to normally diminish the slack in said slack accumulating means, means controlled by the amount of slack in said slack accumulating means when said slack has reached a minimum to control the speed of the warp beaming driving means to bring it into substantial synchronism with the speed of said warp dyeing and treating apparatus, means operative when said slack in said slack accumulating means has reached a maximum to stop the operation of said warp dyeing and treating apparatus, and means operative when the slack in said slack accumulating means has reached a minimum to stop said warp beaming means, said last two mentioned means being automatically operative to start said respective warp dyeing apparatus and warp beaming means when the slack in said slack accumulating means has again come within said respective maximum and minimum limits, manual means for simultaneously varying the speed of all said warp dyeing and treating apparatus and means for manual control of all said driving means.

2. In a dyeing apparatus, dyeing and treating apparatus including means for holding a plurality of warp beams, a plurality of dye vats, each including sets of padding squeeze rolls to draw warp threads from selected beams through its respective vat and means to drive said squeeze rolls whereby warp ends from selected beams may be driven through the respective dye vats, means to combine said individually dyed warp ends into a common beam for weaving, drying means, including rotatable means to draw the combined warp sheet therethrough and means to drive said rotatable means, ageing means including rotatable means to draw the warp therethrough in a sinuous course, means to drive said rotatable means, means to introduce steam within said ageing means and means to introduce volatile organic acid fumes within, a sizing tank including a set of padding squeeze rolls to draw the warp therethrough and means to drive said squeeze rolls, drying means including rotatable means to draw the warp therethrough and means to drive said last mentioned rotatable means at constant speed, means controlled by the slack between said last mentioned drying means and sizing tank to control the speed of said rotatable sizing tank squeeze roll driving means, means controlled by the slack between said sizing tank and ageing means to control the speed of said rotatable ageing means driving means, means controlled by the slack between said ageing means and first mentioned drying means to control the speed of said drying means driving means, means controlled by the slack of the respective warp threads between said first mentioned drying means and said individual dye-vats to selectively control the speed of said respective sets of rotatable dye-vat squeeze roll driving means, warp beaming means, slack accumulating means interposed between said warp beaming means and last mentioned drying means whereby slack may be accumulated therein during the intermittent removal of warp beams to permit the continuous operation of said warp dyeing and treating apparatus disposed in front thereof and manually controlled means to drive said warp beaming means at a greater speed than said respective warp dyeing and treating apparatus to normally diminish the slack in said slack accumulating means, means controlled by the amount of slack in said slack accumulating means when said slack has reached a minimum to control the speed of the warp beaming driving means to bring it into substantial synchronism with the speed of said warp dyeing and treating apparatus, means operative when said slack in said slack accumulating means has reached a maximum to stop the operation of said warp dyeing and treating apparatus, and means operative when the slack in said slack accumulating means has reached a minimum to stop said warp beaming means, said last two mentioned means being automatically operative to start said respective warp dyeing apparatus and warp beaming means when the slack in said slack accumulating means has again come within said respective maximum and minimum limits, manual means for simultaneously varying the speed of all said warp dyeing and treating apparatus and means for manual control of all said driving means.

3. In a dyeing apparatus, dyeing and treating apparatus including means for supplying yarn or fabric in sheet form, dyeing apparatus, including rotatable squeeze rolls to draw the sheet therethrough, means to positively drive all said squeeze rolls at the same peripheral speed, drying means including rotatable means to draw the sheet therethrough and means to drive said rotatable means, ageing means including rotatable means to draw the sheet therethrough in a sinuous course, means to drive said rotatable means, and means to introduce steam within said ageing means, a vat including rotatable squeeze rolls to draw the sheet therethrough, and means to positively drive said squeeze rolls at the same peripheral speed, drying means including rotatable means to draw the sheet therethrough and means to drive said last mentioned rotatable means at constant speed, means controlled by the slack between said last mentioned drying means and vat to control the speed of said rotatable vat squeeze roll driving means, means controlled by the slack between said vat and ageing means to control the speed of said rotatable ageing means driving means, means controlled by the slack between said ageing means and first mentioned drying means to control the speed of said drying means driving means, means controlled by the slack of the sheet between said first mentioned drying means and said dyeing apparatus to control the speed of said rotatable squeeze roll driving means, sheet batching means, slack accumulating means interposed between said sheet batching means and last mentioned drying means whereby slack may be accumulated therein during the intermittent removal of batched sheet units to permit the continuous operation of said sheet dyeing and treating apparatus disposed in front thereof and manually controlled means to drive said sheet batching means, and means controlled by the amount of slack in said slack accumulating means to control the speed of said sheet batching driving means.

4. In a dyeing apparatus, dyeing and treating apparatus including means for supplying yarn or fabric in sheet form, dyeing apparatus, including rotatable squeeze rolls to draw the sheet therethrough and means to drive said squeeze rolls, drying means including rotatable means to draw the sheet therethrough and means to drive said rotatable means, ageing means including rotatable means to draw the sheet therethrough in a sinuous course, means to drive said rotatable means and means to introduce steam within said ageing means, a vat including rotatable squeeze rolls to draw the sheet therethrough and means to drive said squeeze rolls, drying means including rotatable means to draw the sheet therethrough and means to drive said last mentioned rotatable means at constant speed, means controlled by the slack between said last mentioned drying means and vat to control the speed of said rotatable vat squeeze roll driving means, means controlled by the slack between said vat and ageing means to control the speed of said rotatable ageing means driving means, means controlled by the slack between said ageing means and first mentioned drying means to control the speed of said drying means driving means, means controlled by the slack of the sheet between said first mentioned drying means and said dyeing apparatus to control the speed of said rotatable squeeze roll driving means, sheet batching means, slack accumulating means interposed between said sheet batching means and last mentioned drying means whereby slack may be accumulated therein during the intermittent removal of batched sheet units to permit the continuous operation of said sheet dyeing and treating apparatus disposed in front thereof, manually controlled means to drive said sheet batching means, and means controlled by the amount of slack in said slack accumulating means to control the speed of said sheet batching driving means.

5. In a yarn dyeing apparatus, dyeing and treating apparatus including means for holding a plurality of beams, a plurality of dye vats, each including sets of padding squeeze rolls to draw threads from selected beams through its respective vat and means to drive said respective sets of squeeze rolls whereby the ends from selected beams may be driven through the respective dye-vats, means to combine said individually dyed ends into a common beam, drying means, including rotatable means to draw the combined yarn sheet therethrough, and means to drive said rotatable means, ageing means including rotatable means to draw the yarn sheet therethrough in a sinuous course, means to drive said rotatable means and means to introduce steam within said ageing means, a vat including rotatable means to draw the yarn sheet therethrough and means to drive said rotatable means, drying means including rotatable means to draw the yarn sheet therethrough and means to drive said last mentioned rotatable means at constant speed, means controlled by the slack between said last mentioned drying means and vat to control the speed of said rotatable vat driving means, means controlled by the slack between said vat and ageing means to control the speed of said rotatable ageing means driving means, means controlled by the slack between said ageing means and first mentioned drying means to control the speed of said drying means driving means, means controlled by the slack of the respective threads between said first mentioned drying means and said individual dye-vats to selectively control the speed of said respective sets of rotatable dye-vat squeeze rolls, beaming means, slack accumulating means interposed between said beaming means and last mentioned drying means whereby slack may be accumulated therein during the intermittent removal of beams to permit the continuous operation of said dyeing and treating apparatus disposed in front thereof, manually controlled means to drive said beaming means and means controlled by the amount of slack in said slack accumulating means to control the speed of said beaming means driving means.

6. In a dyeing apparatus, dyeing and treating apparatus including means for supplying yarn or fabric in sheet form, dyeing apparatus including rotatable means to draw the sheet therethrough and means to drive said rotatable means, drying means including rotatable means to draw the sheet therethrough, and means to drive said rotatable means, ageing means including rotatable means to draw the sheet therethrough in a sinuous course, and means to introduce steam within said ageing means and means to drive said rotatable means at constant speed, means controlled by the slack of the sheet between said ageing means and drying means to control the speed of said drying means driving means, means controlled by the slack of the sheet between said drying means and said dyeing apparatus to control the speed of said dyeing apparatus driving means, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof and manually controlled means to drive said sheet batching means at greater speed than said respective sheet dyeing and treating apparatus to normally diminish the slack in said slack accumulating means, means controlled by the amount of slack in said slack accumulating means, when said slack has reached a minimum to control the speed of the sheet batching driving means to bring it into substantial synchronism with the speed of said sheet dyeing and treating apparatus, means operative when said slack in said slack accumulating means has reached a maximum to stop the operation of said sheet dyeing and treating apparatus, and means operative when the slack in said slack accumulating means has reached a minimum to stop said sheet batching means, said last two mentioned means being automatically operative to start said slack accumulating means when the slack in said slack accumulating means has again come within said respective maximum and minimum limits, manual means for simultaneously varying the speed of all said sheet dyeing and treating apparatus and means for manual control of all said driving means.

7. In a dyeing apparatus, dyeing and treating apparatus including means for supplying yarn or fabric in sheet form, dyeing apparatus, including rotatable means to draw the sheet therethrough and means to drive said rotatable means, drying means, including rotatable means to draw the sheet therethrough and means to drive said rotatable means, ageing means including rotatable means to draw the sheet therethrough in a sinuous course, means to introduce steam within said ageing means and means to drive said last mentioned rotatable means at constant speed, means controlled by the slack of the sheet between said ageing means and drying means to control the speed of said drying means driving means, means controlled by the slack of the sheet between said dyeing apparatus and said drying means to control the speed of said driving means for said dyeing apparatus, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof, means to drive said sheet batching means at a greater speed than said respective sheet dyeing and treating apparatus to normally diminish the slack in said slack accumulating means, means controlled by the amount of slack in said slack accumulating means when said slack has reached a minimum to control the speed of the sheet batching driving means to bring it into substantial synchronism with the speed of said sheet dyeing and treating apparatus, means operative when said slack in said slack accumulating means has reached a maximum to stop the operation of said sheet dyeing and treating apparatus, and means operative when the slack in said slack accumulating means has reached a minimum to stop said sheet batching means, said last two mentioned means being automatically operative to start said respective sheet dyeing and treating apparatus and sheet batching means when the slack in said slack accumulating means has again come within said respective maximum and minimum limits.

8. In a dyeing apparatus, dyeing and treating apparatus including means for supplying yarn or fabric in sheet form, dyeing apparatus including rotatable means to draw the sheet therethrough and means to drive said rotatable means, drying means including rotatable means to draw the sheet therethrough and means to drive said rotatable means, ageing means including rotatable means to draw the sheet therethrough in a sinuous course, means to introduce steam within said ageing means, and means to drive said last mentioned rotatable means at constant speed, means controlled by the slack of the sheet between said ageing means and drying means to control the speed of said drying means driving means, means controlled by the slack of the sheet between said drying means and said dyeing apparatus to control the speed of said driving means for said dyeing apparatus, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof, means to drive said sheet batching means at a greater speed than said respective sheet dyeing and treating apparatus to normally diminish the slack in said slack accumulating means, means controlled by the amount of slack in said slack accumulating means when said slack has reached a minimum to control the speed of the sheet batching driving means to bring it into substantial synchronism with the speed of said sheet dyeing and treating apparatus, means operative when said slack in said slack accumulating means has reached a maximum to stop the operation of said sheet dyeing and treating apparatus, and means operative when the slack in said slack accumulating means has reached a minimum to stop said sheet batching means.

9. In a dyeing apparatus, dyeing and treating apparatus including means for supplying yarn or fabric in sheet form, dyeing apparatus including rotatable means to draw the sheet therethrough and means to drive said rotatable means, drying means including rotatable means to draw the sheet therethrough and means to drive said rotatable means, ageing means, including rotatable means to draw the sheet therethrough in a sinuous course, means to introduce steam within said ageing means and means to drive said last mentioned rotatable means at constant speed, means controlled by the slack of the sheet between said ageing means and drying means to control the speed of said drying means driving means, means controlled by the slack of the sheet between said dyeing apparatus and drying means to control the speed of said driving means for said dyeing apparatus, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof, means to drive said sheet batching means at a greater speed than said respective sheet dyeing and treating apparatus to normally diminish the slack in said accumulating means, and means controlled by the amount of slack in said slack accumulating means when said slack has reached a minimum to control the speed of the sheet batching driving means to bring it into substantial synchronism with the speed of said sheet dyeing and treating apparatus.

10. In a dyeing apparatus, dyeing and treating apparatus including means for supplying yarn or fabric in sheet form, dyeing apparatus including rotatable means to draw sheet therethrough and means to drive said rotatable means, drying means including rotatable means to draw the sheet therethrough and means to drive said rotatable means, ageing means, including rotatable means to draw the sheet therethrough in a sinuous course, means to introduce steam within said ageing means and means to drive said last mentioned rotatable means at constant speed, means controlled by the slack of the sheet between said ageing means and drying means to control the speed of said drying means driving means, means controlled by the slack of the sheet between said drying means and said dyeing apparatus to control the speed of said rotatable driving means for said dyeing apparatus, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof, means to drive said sheet batching means and means controlled by the amount of slack in said slack accumulating means to control the speed of said sheet batching means driving means.

11. In a dyeing apparatus, dyeing and treating apparatus including means for holding a plurality of beams, a plurality of dye-vats, each including sets of padding squeeze rolls to draw threads from selected beams through its respective vat in sheet form, and means to drive said respective sets of squeeze rolls whereby ends from selected beams may be driven in sheet form through said respective dye-vats, means to combine said individually dyed ends into a common beam, drying means including rotatable means to draw the combined yarn sheet therethrough and means to drive said rotatable means, ageing means including rotatable means to draw the yarn sheet therethrough in a sinuous course and means to drive said rotatable means, means to introduce steam within said ageing means, and means to drive said last mentioned rotatable means at constant speed, means controlled by the slack between said ageing means and drying means to control the speed of said drying means driving means, means controlled by the slack of the respective yarn threads between said drying means and said individual dye-vats to selectively control the speed of said respective sets of rotatable squeeze rolls, beaming means, slack accumulating means interposed between said beaming means and ageing means whereby slack may be accumulated therein during the intermittent removal of beams to permit the continuous operation of said sheet yarn dyeing and treating apparatus disposed in front thereof, manually controlled means to drive said beaming means, and means controlled by the amount of slack in said slack accumulating means to control the speed of said beaming driving means.

12. Apparatus according to claim 1, in which each individual slack controlled means comprises gravity actuated means held up by the warp against the force of gravity and each individual driving means comprises an electric motor, and the position of each slack controlled means and the slack accumulating means controlls a rheostat which controls its respective electric motor.

13. Apparatus according to claim 1, in which each individual slack controlled means comprises gravity actuated means held up by the warp against the force of gravity.

14. Apparatus according to claim 10, in which each individual slack controlled means comprises gravity actuated means held up by the sheet against the force of gravity and each individual drive means comprises an electric motor, and the position of the slack controlled means and slack accumulating means controls a rheostat which controls its respective electric motor.

15. Apparatus according to claim 10, in which each individual slack controlled means comprises gravity actuated means held up by the sheet against the force of gravity.

16. In a dyeing apparatus, dyeing and treating apparatus including means for holding a plurality of warp beams, a plurality of dye-vats, each including padding squeeze rolls to draw threads from selected beams through its respective vat and means to drive said respective squeeze rolls whereby warp ends from selected beams may be driven through the respective dye-vats, means to combine said individually dyed warp ends into a common warp for weaving including rotatable means to draw the combined warp sheet therethrough and means to drive said rotatable means, ageing means including rotatable means to draw the warp therethrough in a sinuous course, means to drive said rotatable means, means to introduce steam within said ageing means and means to introduce volatile organic acid fumes within, a sizing tank including rotatable means to draw the warp therethrough and means to drive said rotatable means, drying means including rotatable means to draw the warp therethrough and means to drive said last mentioned rotatable means at constant speed, means controlled by the slack between said last mentioned drying means and sizing tank to control the speed of said rotatable sizing tank driving means, means controlled by the slack between said sizing tank and ageing means to control the speed of said rotatable ageing means driving means, means controlled by the slack between said ageing means and first mentioned drying means to control the speed of said drying means driving means, means controlled by the slack of the respective warp threads between said first mentioned drying means and said individual dye-vats to selectively control the speed of said rotatable dye-vat squeeze rolls, warp beaming means, slack accumulating means interposed between said warp beaming means and last mentioned drying means whereby slack may be accumulated therein during the intermittent removal of warp beams to permit the continuous operation of said warp dyeing and treating apparatus disposed in front thereof, in which each individual slack controlled means comprises gravity actuated means held up by the warp against the force of gravity and each individual drive means comprises an electric motor and the position of each slack controlled means and slack accumulating means controls a rheostat which controls its respective electric motor, an electric motor to drive said warp beaming means at a greater speed than said warp dyeing and treating apparatus to normally diminish the slack in said slack accumulating means, a rheostat to operate said motor, means to actuate said rheostat controlled by the amount of slack in said slack accumulating means when said slack has reached a minimum to control the speed of said warp dyeing and treating apparatus, a control box to which the respective motors in said dyeing apparatus are connected for starting, stopping and varying the speed thereof, a manually controlled rheostat for simultaneously varying the speed of all said warp dyeing and treating means, a limit switch connected to said control box and placed relative to said slack accumulating means to be operative when the slack therein has reached a maximum to stop the operation of said warp dyeing and treating apparatus and a limit switch connected to said control box and mounted relative to said slack accumulating means to be operative when the slack in said slack accumulating means has reached a minimum to stop said warp beaming means.

17. In a dyeing apparatus, dyeing and treating apparatus including means for supplying yarn or fabric in sheet form, dyeing apparatus including rotatable means to draw the sheet therethrough and means to drive said rotatable means, dyeing means including rotatable means to draw the sheet therethrough and means to drive said rotatable means, ageing means including rotatable means to draw the sheet therethrough in a sinuous course, means to introduce steam within said ageing means and means to drive said ageing means driving means at constant speed, means controlled by the slack of the sheet between said ageing means and drying means to control the speed of said drying means driving means, means controlled by the slack of the sheet between said dyeing apparatus and said drying means to control the speed of said driving means for dyeing apparatus, sheet batching means, slack accumulating means interposed between said sheet batching means and ageing means whereby slack may be accumulated therein during the intermittent removal of batched sheet units to permit the continuous operation of said sheet dyeing and treating apparatus disposed in front thereof, in which each individual slack controlled means comprises gravity actuated means held up by the sheet against the force of gravity and each individual drive means comprises an electric motor and the position of each slack controlled means and slack accumulating means controls its respective electric motor, an electric motor to drive said sheet batching means at a greater speed than said sheet dyeing and treating apparatus to normally diminish the slack in said slack accumulating means, a rheostat to operate said motor, means to actuate said rheostat controlled by the amount of slack in said slack accumulating means when said slack has reached a minimum to control the speed of said sheet dyeing and treating apparatus, a control box to which the respective motors in said dyeing apparatus are connected for starting, stopping and varying the speed thereof, a manually controlled rheostat for simultaneously varying the speed of all said sheet dyeing means, a limit switch connected to said control box and placed relative to said slack accumulating means to be operative when the slack therein has reached a maximum to stop the operation of said sheet dyeing and treating apparatus and a limit switch connected to said control box and mounted relative to said slack accumulating means to be operative when the slack in said slack accumulating means has reached a minimum to stop said sheet batching means.

18. In combination, a continuous web treating apparatus composed of a plurality of units for treating web in sheet form, electric motors for individually driving each of said units, means for driving an end motor at constant speed, rheostats for controlling the respective speeds of said other unit motors, gravity actuated means controlled by the slack between units for controlling said respective rheostats for varying the speeds of said respective motors in proportion to the slack between units, web loading apparatus, slack accumulating means interposed between said web loading apparatus and said constant speed unit whereby slack may be accumulated therein during the intermittent loading of web units to permit the continuous operation of said web treating apparatus, means to drive said web loading apparatus at a different speed than said adjacent constant speed unit to normally diminish the slack in said slack accumulating means, means controlled by the amount of slack in said slack accumulating means when said slack has reached a minimum to control the speed of the web loading apparatus driving means to bring it into substantial synchronism with the speed of said web treating apparatus, means operative when said slack in said slack accumulating means has reached a maximum to stop the operation of one of said apparatuses, and means operative when the slack in said slack accumulating means has reached a minimum to stop the operation of said other apparatus, said last mentioned means being automatically operative to start said respective web treating and web loading apparatus when the slack in said slack accumulating means has again come within said respective maximum and minimum limits.

19. In combination, a continuous web treating apparatus composed of a plurality of units for treating web in sheet form, electric motors for individually driving each of said units, means for driving an end motor at constant speed, rheostats for controlling the respective speeds of said other unit motors, gravity actuated means controlled by the slack between units for controlling said respective rheostats for varying the speed of said respective motors in proportion to the slack between units, web loading apparatus, slack accumulating means interposed between said web loading apparatus and said constant speed unit whereby slack may be accumulated therein during the intermittent loading of web units to permit the continuous operation of said web treating apparatus, means to drive said web loading apparatus at a different speed than said adjacent constant speed unit to normally diminish the slack in said slack accumulating means, means controlled by the amount of slack in said slack accumulating means when said slack has reached a minimum to control the speed of the web loading apparatus driving means to bring it into substantial synchronism with the speed of said web treating apparatus, means operative when said slack in said slack accumulating means has reached a maximum to stop the operation of one of said apparatuses, and means operative when the slack in said slack accumulating means has reached a minimum to stop the operation of said other apparatus.

20. In combination, a continuous web treating apparatus composed of a plurality of units for treating web in sheet form, electric motors for individually driving each of said units, means for driving an end motor at constant speed, rheostats for controlling the respective speeds of said other unit motors, gravity actuated means controlled by the slack between units for controlling said respective rheostats for varying the speeds of said respective motors in proportion to the slack between units, web loading apparatus, slack accumulating means interposed between said web loading apparatus and said constant speed unit whereby slack may be accumulated therein during the intermittent loading of web units to permit the continuous operation of said web treating apparatus, means to drive said web loading apparatus at a different speed than said adjacent constant speed unit to normally diminish the slack in said slack accumulating means and means controlled by the amount of slack in said slack accumulating means when said slack has reached a minimum to control the speed of the web loading apparatus driving means to bring it into substantial synchronism with the speed of said web treating apparatus.

21. In combination, a continuous web treating apparatus composed of a plurality of units for treating web, electric motors for individually driving each of said units, means for driving an end motor at constant speed, rheostats for controlling the respective speeds of said other unit motors, gravity actuated means controlled by the slack between units for controlling said respective rheostats for varying the speed of said other motors, in proportion to the slack between units, web loading apparatus, slack accumulating means interposed between said web loading apparatus and said constant speed unit whereby slack may be accumulated therein during the intermittent loading of web units to permit the continuous operation of said web treating apparatus, an electric motor for driving said web loading apparatus at a different speed than said adjacent web treating apparatus constant speed unit to normally diminish the slack in said slack accumulating means, a rheostat to operate said motor, means to operate said rheostat controlled by the amount of slack in said slack accumulating means when said slack has reached a minimum, a limit switch placed relative to said slack accumulating means operative when the slack therein has reached a maximum to stop the operation of one of said apparatuses and a limit switch mounted relative to said slack accumulating means operative when slack in said slack accumulating means has reached a minimum to stop said other apparatus, said limit switches being automatically operative to start said respective units when the slack in said slack accumulating means has again come within said respective maximum and minimum limits.

22. In a combination, continuous web treating apparatus composed of a plurality of units for treating web, electric motors for individually driving each of said units, means for driving an end motor at constant speed, rheostats for controlling the respective speeds of said other unit motors, gravity actuated means controlled by the slack between units for controlling said respective rheostats for varying the speeds of said other motors in proportion to the slack between units, web loading apparatus, slack accumulating means interposed between said web loading apparatus and said constant speed unit whereby slack may be accumulated therein during the intermittent loading of web units to permit the continuous operation of said web treating apparatus, an electric motor for driving said web loading apparatus at a different speed than said web treating unit to normally diminish the slack in said slack accumulating means, a rheostat to operate said motor, means to operate said rheostat controlled by the amount of slack in said slack accumulating means when said slack has reached a minimum, a limit switch placed relative to said slack accumulating means operative when the slack therein has reached a maximum to stop the operation of one of said apparatuses and a limit switch mounted relative to said slack accumulating means operative when the slack in said slack accumulating means has reached a minimum to stop said other apparatus.

23. In combination, a continuous web treating apparatus composed of a plurality of units for treating web, electric motors for individually driving each of said units, means for driving an end motor at constant speed, rheostats for controlling the respective speeds of said other unit motors, gravity actuated means controlled by the slack between units for controlling said respective rheostats for varying the speed of said other motors in proportion to the slack between said other units, web loading apparatus, slack accumulating means interposed between said web loading apparatus and said constant speed unit whereby slack may be accumulated therein during the intermittent loading of web units to permit the continuous operation of said web treating apparatus, an electric motor for driving said web loading apparatus at a different speed than said web treating unit to normally diminish the slack in said slack accumulating means, a rheostat to operate said motor, and means to operate said rheostat controlled by the amount of slack in said slack accumulating means when said slack has reached a minimum.

24. In combination, a web treating unit, means to continuously drive said web treating unit, a web loading unit, slack accumulating means interposed between said web loading unit and web treating unit whereby slack may be accumulated therein during the intermittent loading of web units to permit the continuous operation of said web treating unit, manually controlled means to drive said web loading unit at a different speed than said web treating unit to normally diminish the slack in said slack accumulating means, means controlled by the amount of slack in said slack accumulating means when said slack has reached a minimum to control the speed of the web loading means driving means to bring it into substantial synchronism with the speed of said web treating unit, means operative when said slack in said slack accumulating means has reached a maximum to stop the operation of one of said units, and means operative when the slack in said slack accumulating means has reached a minimum to stop the operation of the other of said units, said last two mentioned means being automatically operative to start said respective units when the slack in said slack accumulating means has again come within said respective maximum and minimum limits.

25. In combination, a web treating unit, means to continuously drive said web treating unit, a web loading unit, slack accumulating means interposed between said web loading unit and web treating unit whereby slack may be accumulated therein during the intermittent loading of web units to permit the continuous operation of said web treating unit, manually controlled means to drive said web loading unit at a different speed than said web treating unit to normally diminish the slack in said slack accumulating means, means controlled by the amount of slack in said slack accumulating means when the slack has reached a minimum to control the speed of the web loading means driving means to bring it into substantial synchronism with the speed of said web treating unit, means operative when said slack in said slack accumulating means has reached a maximum to stop the operation of one of said units, and means operative when the slack in said slack accumulating means has reached a minimum to stop the operation of the other of said units.

26. In combination, a web treating unit, means to continuously drive said web treating unit, a web loading unit, slack accumulating means interposed between said web loading unit and web treating unit whereby slack may be accumulated therein during the intermittent loading of web units to permit the continuous operation of said web treating unit, manually controlled means normally operative to drive said web loading unit at a different speed than said web treating unit to normally diminish the slack in said slack accumulating means and means controlled by the amount of slack in said slack accumulating means when said slack has reached a minimum to control the speed of the web loading means driving means to bring it into substantial synchronism with the speed of said web treating unit.

27. In combination, a web treating unit, electric means to continuously drive said web treating unit, a web loading unit, slack accumulating means interposed between said web loading unit and web treating unit whereby slack may be accumulated therein during the intermittent loading of web units to permit the continuous operation of said web treating unit, an electric motor to drive said web loading unit at a different speed than said web treating unit to normally diminish the slack in said slack accumulating means, a rheostat to operate said motor, means to operate said rheostat controlled by the amount of slack in said slack accumulating means when said slack has reached a minimum, a limit switch placed relative to said slack accumulating means to be operative when the slack therein has reached a maximum to stop the operation of one of said units and a limit switch mounted relative to said slack accumulating means to be operative when slack in said slack accumulating means has reached a minimum to stop said other unit, said limit switches being automatically operative to start said respective units when the slack in said slack accumulating means has again come within said respective maximum and minimum limits.

28. In combination, a web treating unit, electric means to continuously drive said web treating unit, a web loading unit, slack accumulating means interposed between said web loading unit and web treating unit whereby slack may be accumulated therein during the intermittent loading of web units to permit the continuous operation of said web treating unit, an electric motor for driving said web loading unit at a different speed than said web treating unit to normally diminish the slack in said slack accumulating means, a rheostat to operate said motor, means to operate said rheostat controlled by the amount of slack in said slack accumulating means when said slack has reached a minimum, a limit switch placed relative to said slack accumulating means to be operative when the slack therein has reached a maximum to stop the operation of one of said units and a limit switch mounted relative to said slack accumulating means to be operative when the slack in said slack accumulating means has reached a minimum to stop said other unit.

29. In combination, a web treating unit, electric means to continuously drive said web treating unit, a web loading unit, slack accumulating means interposed between said web loading unit and web treating unit whereby slack may be accumulated therein during the intermittent loading of web units to permit the continuous operation of said web treating unit, an electric motor for driving said web loading unit at a different speed than said web treating unit to normally diminish the slack in said slack accumulating means, a rheostat to operate said motor, and means to operate said rheostat automatically controlled by the amount of slack in said slack accumulating means when said slack has reached a minimum.

30. A slack accumulator for use between web treating units, one of which is designed to operate continuously having electric driving means therefor and the other of which is a loading or unloading unit designed to operate intermittently, having an electric motor for driving it normally at a different speed than the speed of said continuously operated unit, a slack accumulator comprising a stationary set of aligned rolls over which runs of web are adapted to individually pass, a carriage constrained to reciprocate in a vertical plane having a set of cooperating rolls mounted thereon under which runs of web are adapted to pass, adapted to drop to accumulate slack between said sets of rolls and counterbalanced to rise as said slack is taken up to exert a light pull on said web, means driven by said continuous electric unit driving means to rotate a center roll of said upper set of rolls to assist in accumulating slack therein, a rheostat adapted to be connected to and for controlling said intermittently operated motor mounted adjacent to said slack accumulator, cord means to rotate said rheostat to control the speed of said motor, having a weight on one end thereof, constrained to move in a vertical plane adapted to be raised by said carriage to rotate said rheostat to bring said intermittently operated motor into substantial synchronism with said continuously operated electric driving means when the slack in said accumulator has reached a minimum, a counterweight attached to the opposite end of said cord means, means to limit the dropping movement of said weight to control the synchronizing range of said rheostat as said carriage is lowered and limit switches mounted so as to be contacted by said vertically reciprocatable carriage to respectively stop the electric means for driving the continuously operated unit and the motor for driving the intermittently operated unit at respective maximum and minimum slack accumulating positions of said carriage.

31. A slack accumulator for use between web treating units, one of which is designed to operate continuously having driving means therefor and the other of which is a loading or unloading unit designed to operate intermittently having means for driving it normally at a different speed than the speed of said continuously operated unit driving means, comprising a stationary set of aligned rolls over which runs of web are adapted to individually pass, a carriage constrained to reciprocate in a vertical plane having a set of cooperatingly aligned rolls mounted thereon under which runs of web are adapted to individually pass, adapted to drop to accumulate slack between said sets of rolls and counterbalanced to rise as said slack is taken up to exert a light pull on said web, means adapted to be driven by said continuously operated unit driving means to rotate a center roll of said upper rolls to assist in accumulating slack therein, means controlled by the height of said carriage when said carriage has reached a height to control the speed of the intermittently operated unit driving means to bring it into substantial synchronism with the speed of said continuously operated unit driving means to compensate for stretch and shrinkage of the web between said loading and continuously driven units, means mounted so as to be contacted by said vertically reciprocatable carriage to respectively stop the means for driving the continuously operated unit and the means for driving the intermittently operated unit at maximum and minimum slack accumulating positions of said carriage and respectively automatically start said respective driving means as the slack in said slack accumulator again comes within said respective limits.

32. A slack accumulator for use between web treating units, one of which is designed to operate continuously having driving means therefor, and the other of which is a loading or unloading unit designed to operate intermittently having means for driving it normally at a different speed than the speed of said continuously operated unit driving means, comprising a stationary set of rolls over which runs of web are adapted to individually pass, a carriage having a set of cooperating rolls mounted thereon under which runs of web are adapted to pass, and means controlled by the height of said carriage when said carriage has reached a height to control the speed of the intermittently operated unit driving means to bring it into substantial synchronism with the speed of said continuously operated unit driving means, to compensate for stretch and shrinkage of the web between said loading and continuously driven units.

33. A slack accumulator, for use between web treating units, one of which is designed to operate continuously having driving means therefor and the other of which is a loading or unloading unit designed to operate intermittently having means for driving it normally at a different speed than the speed of said continuously operated unit driving means, comprising a stationary set of rolls over which runs of web are adapted to individually pass, a carriage constrained to reciprocate in a vertical plane having a set of cooperating rolls mounted thereon under which runs of web are adapted to individually pass, adapted to drop to accumulate slack between said sets of rolls and counterbalanced to rise as said slack is taken up to exert a light pull on said web, means driven by said continuously operated unit driving means to rotate a center roll of said upper set of rolls to assist in accumulating slack therein, and means controlled by the height of said carriage when said carriage has reached a height to control the speed of the intermittently operated unit to bring it into substantial synchronism with the speed of said continuously operated unit to compensate for stretch and shrinkage of the web between said loading and continuously driven units.

34. A slack accumulator for use between web treating units one of which is designed to operate continuously having driving means therefor and the other of which is a loading or unloading unit designed to operate intermittently having means for driving it normally at a different speed than the speed of said continuously operated unit, comprising a stationary set of rolls over which runs of web are adapted to pass, a carriage constrained to reciprocate in a vertical plane, having a set of cooperating rolls mounted thereon under which runs of web are adapted to pass, adapted to drop to accumulate slack between said sets of rolls and counterbalanced to rise as said slack is taken up to exert a light pull on said web and means controlled by the height of said carriage when said carriage has reached a height to control the speed of the intermittently operated unit driving means to bring it into substantial synchronism with the speed of said continuously operated unit driving means to compensate for stretch and shrinkage of the web between said loading and continuous units, and means mounted so as to be contacted by said vertically reciprocatable carriage to respectively stop the means for driving the continuously operated unit and the means for driving the intermittently operated unit at maximum and minimum slack accumulating positions of said carriage.

35. A slack accumulator for use between web treating units one of which is designed to operate continuously having driving means therefor and the other of which is a loading or unloading unit designed to operate intermittently having means for driving it normally at a different speed than the speed of said continuously operated unit driving means, comprising a stationary set of rolls over which runs of web are adapted to individually pass, a carriage constrained to reciprocate in a vertical plane having a set of cooperating rolls mounted thereon under which runs of web are adapted to pass, adapted to drop to accumulate slack between said sets of rolls and counterbalanced to rise as said slack is taken up to exert a light pull on said web and means controlled by the height of said carriage when said carriage has reached a height to control the speed of the intermittently operated unit driving means to bring it into substantial synchronism with the speed of said continuously operated unit driving means, to compensate for stretch and shrinkage of the web between said loading and continuously driven units.

36. A slack accumulator for use between web treating units, one of which is designed to operate continuously having driving means therefor and the other of which is a loading or unloading unit designed to operate intermittently having means for driving it normally at a different speed than the speed of said continuously operated unit, comprising a stationary set of rolls over which runs of web are adapted to individually pass, a carriage having a set of cooperating rolls mounted thereon under which runs of web are adapted to pass and means controlled by the height of said carriage when said carriage has reached a height to control the speed of the intermittently operated unit driving means to bring it into substantial synchronism with the speed of said continuously operated unit driving means, to compensate for stretch and shrinkage of the web between said loading and continuously driven units, and means mounted so as to be contacted by said vertically reciprocatable carriage to stop the means for driving the continuously operated unit and the means for driving the intermittently operated unit at maximum and minimum slack accumulating positions of said carriage.

37. A slack accumulator for use between web treating units, one of which is designed to operate continuously having driving means therefor and the other of which is a loading or unloading unit designed to operate intermittently having means for driving it normally at a different speed than the speed of said continuously operated unit comprising a stationary set of rolls over which runs of web are adapted to pass, a carriage having a set of cooperating rolls mounted thereon under which runs of web are adapted to pass, means driven by said continuously operated unit driving means to rotate a center roll of said upper set of rolls to assist in accumulating slack therein, and means controlled by the height of said carriage when said carriage has reached a height to control the speed of the intermittently operated unit driving means to bring it into substantial synchronism with the speed of said continuously operated unit driving means.

38. A slack accumulator for use between web treating units, one of which is designed to operate continuously having electric driving means therefor, and the other of which is a loading or unloading unit designed to operate intermittently, having an electric motor for driving it normally at a different speed than the speed of said continuously operated driving unit, comprising a stationary set of aligned rolls over which the runs of web are adapted to individually pass, a carriage constrained to reciprocate in a vertical plane having a set of cooperatingly aligned rolls mounted thereon under which runs of web are adapted to pass, adapted to drop to accumulate slack between said set of rolls and counterbalanced to rise as said slack is taken up to exert a light pull on said web, means adapted to be driven by said continuous unit electric driving means to rotate a center roll of said upper set of rolls to assist in accumulating slack therein, a full-field rheostat adapted to be connected to and for controlling said intermittently operated motor mounted adjacent to said slack accumulator, cord means to rotate said rheostat to control the speed of said motor, having a weight on one end thereof constrained to move in a vertical plane, and adapted to be raised by said carriage to rotate said rheostat to bring said intermittently operated motor into substantial synchronism with said continuously operated electric driving means when the slack in said accumulator has reached a minimum, a counterweight attached to the opposite end of said cord means, means to limit the dropping movement of said weight to control the synchronizing range of said rheostat as said carriage is lowered, limit switches mounted so as to be contacted by said vertically reciprocatable carriage to respectively stop the electric means for driving the continuously operated unit and the motor for driving the intermittently operated unit at maximum and minimum slack accumulating positions of said carriage and respectively automatically start said respective driving means as the slack in said slack accumulator again comes within said limits.

39. A slack accumulator for use between web treating units, one of which is designed to operate continuously having electric driving means and the other of which is a loading or unloading unit designed to operate intermittently having an electric motor for driving it normally at a different speed than the speed of said continuously operated driving means unit, comprising a stationary set of aligned rolls over which runs of web are adapted to individually pass, a carriage having a set of aligned rolls mounted therein under which runs of web are adapted to pass, a rheostat adapted to be connected to and for controlling said intermittently operated motor mounted adjacent to said slack accumulator, cord means to rotate said rheostat to control the speed of said motor, having a weight on one end thereof, adapted to be raised by said carriage to rotate said rheostat to bring said intermittently operated motor into substantial synchronism with said continuously operated electric driving means when the slack in said accumulator has reached a minimum, and means to limit the dropping movement of said weight to control the synchronizing range of said rheostat as said carriage is lowered.

40. A slack accumulator for use between web treating units, one of which is designed to operate continuously having electric driving means and the other of which is a loading or unloading unit designed to operate intermittently having an electric motor for driving it normally at a different speed than the speed of said continuously operated unit, comprising a stationary set of rolls over which runs of web are adapted to individually pass, a carriage having a set of aligned rolls mounted thereon under which runs of web are adapted to pass, a full-field rheostat adapted to be connected to and for controlling said intermittently operated motor mounted adjacent to said slack accumulator, cord means to rotate said full-field rheostat to control the speed of said motor, having a weight on one end thereof, adapted to be raised by said carriage to rotate said full-field rheostat to bring said intermittently operated motor into substantial synchronism with said continuously operated electric driving means when the slack in said accumulator has reached a minimum and means to limit the dropping movement of said weight to control the synchronizing range of said full-field rheostat as said carriage is lowered.

MURRAY N. BULFORD.